United States Patent
van Schoor et al.

(10) Patent No.: US 7,828,299 B2
(45) Date of Patent: *Nov. 9, 2010

(54) FLUID-ACTIVATED SHAFT SEAL

(75) Inventors: Marthinus van Schoor, Medford, MA (US); David Gilbert, Andover, MA (US); Andrew Cutler, Boston, MA (US); Steven Klepper, Medford, MA (US)

(73) Assignee: MIDE Technology Corporation, Medford, MA (US)

( * ) Notice: Subject to any disclaimer, the term of this patent is extended or adjusted under 35 U.S.C. 154(b) by 368 days.

This patent is subject to a terminal disclaimer.

(21) Appl. No.: 12/134,848

(22) Filed: Jun. 6, 2008

(65) Prior Publication Data

US 2008/0303218 A1    Dec. 11, 2008

Related U.S. Application Data

(63) Continuation-in-part of application No. 11/286,680, filed on Nov. 22, 2005, now Pat. No. 7,686,308.

(60) Provisional application No. 60/629,911, filed on Nov. 22, 2004.

(51) Int. Cl.
*F16J 15/02* (2006.01)

(52) U.S. Cl. .................. 277/551; 277/553; 277/556

(58) Field of Classification Search ........... 277/551, 277/549, 553, 556
See application file for complete search history.

(56) References Cited

U.S. PATENT DOCUMENTS

| | | | | |
|---|---|---|---|---|
| 2,185,790 A | * | 1/1940 | Kosatka et al. | 277/562 |
| 2,565,923 A | | 8/1951 | Hrdlicka, Jr. | 277/346 |
| 2,849,070 A | | 8/1958 | Maly | 277/336 |
| 2,866,670 A | * | 12/1958 | Harris et al. | 384/484 |
| 3,413,008 A | | 11/1968 | Greiner | 277/505 |
| 3,945,650 A | * | 3/1976 | Voitik | 277/556 |
| 3,948,531 A | | 4/1976 | Mitrani | 277/9 |
| 4,155,957 A | | 5/1979 | Sasayama | 260/897 B |
| 4,182,518 A | | 1/1980 | Bunyan | 277/65 |
| 4,188,039 A | | 2/1980 | Krisak et al. | 277/95 |
| 4,348,031 A | | 9/1982 | Johnston | 277/83 |
| 4,403,779 A | | 9/1983 | Wilkinson | 277/27 |
| 4,413,829 A | * | 11/1983 | Pietsch | 277/504 |
| 4,449,713 A | | 5/1984 | Ishido et al. | 277/312 |

(Continued)

FOREIGN PATENT DOCUMENTS

DE    41 21 193 A1    1/1993

(Continued)

*Primary Examiner*—Vishal Patel
(74) *Attorney, Agent, or Firm*—Iandiorio Teska & Coleman

(57) ABSTRACT

Systems and methods associated with a fluid-activated shaft seal are provided. The systems, which feature multiple components, include a support component defining an exterior surface, a carrier component including an interior surface to slideably engage the exterior surface of the support component, and a seal disposed relative to the carrier component. The seal includes a lip portion and a fluid-responsive gel material that expands when exposed to a fluid to urge the lip portion towards or into contact with a shaft. The gel material contracts in the absence of the fluid to form or increase the size of a gap between the shaft and the lip portion. Methods of assembling and installing such a system are also described.

9 Claims, 17 Drawing Sheets

U.S. PATENT DOCUMENTS

| | | | |
|---|---|---|---|
| 4,449,719 A | 5/1984 | Radosay et al. | 277/192 |
| 4,595,206 A | 6/1986 | Hölzer | 277/25 |
| 4,643,439 A | 2/1987 | Lewis et al. | 277/95 |
| 4,740,404 A | 4/1988 | Otsugu et al. | 428/44 |
| 4,954,084 A | 9/1990 | Pugh et al. | 439/29 |
| 5,024,450 A | 6/1991 | Hawley et al. | 277/37 |
| 5,096,356 A | 3/1992 | Foster | 414/325 |
| 5,125,502 A | 6/1992 | Foster | 198/750 |
| 5,176,677 A | 1/1993 | Wuchinich | 606/46 |
| 5,216,840 A | 6/1993 | Andrews | 49/483.1 |
| 5,624,290 A | 4/1997 | von Bergen et al. | 440/80 |
| 5,639,098 A | 6/1997 | MacDonald | 277/88 |
| 6,039,320 A | 3/2000 | MacDonald | 277/370 |
| 6,173,964 B1 * | 1/2001 | Bell et al. | 277/584 |
| 6,224,058 B1 | 5/2001 | Drebing et al. | 277/313 |
| 6,234,910 B1 | 5/2001 | Norberg | 464/182 |
| 6,240,321 B1 | 5/2001 | Janke et al. | 607/122 |
| 6,254,102 B1 | 7/2001 | Vicory, Sr. | 277/390 |
| 6,303,711 B1 | 10/2001 | Sumiya et al. | 526/73 |
| 6,524,151 B1 | 2/2003 | Clemente et al. | 440/112 |
| 6,698,669 B2 | 3/2004 | Rieben | 239/225.1 |
| 6,702,300 B1 | 3/2004 | Steinetz et al. | 277/642 |
| 7,313,829 B1 | 1/2008 | Serra et al. | 2/2.15 |
| 2002/0016622 A1 | 2/2002 | Janke et al. | 607/116 |
| 2005/0038368 A1 | 2/2005 | Richter et al. | 602/41 |
| 2008/0303218 A1 | 12/2008 | van Schoor et al. | |

FOREIGN PATENT DOCUMENTS

| | | |
|---|---|---|
| GB | 2061415 A | 5/1981 |
| GB | 2417993 A | 3/2006 |
| JP | 60-192167 | 9/1985 |
| JP | 63-087309 | 4/1988 |
| JP | 10-073188 | 3/1998 |
| JP | 11-324506 | 11/1999 |
| NL | 6610389 | 1/1967 |
| WO | WO 2006/086039 A1 | 8/2006 |

* cited by examiner

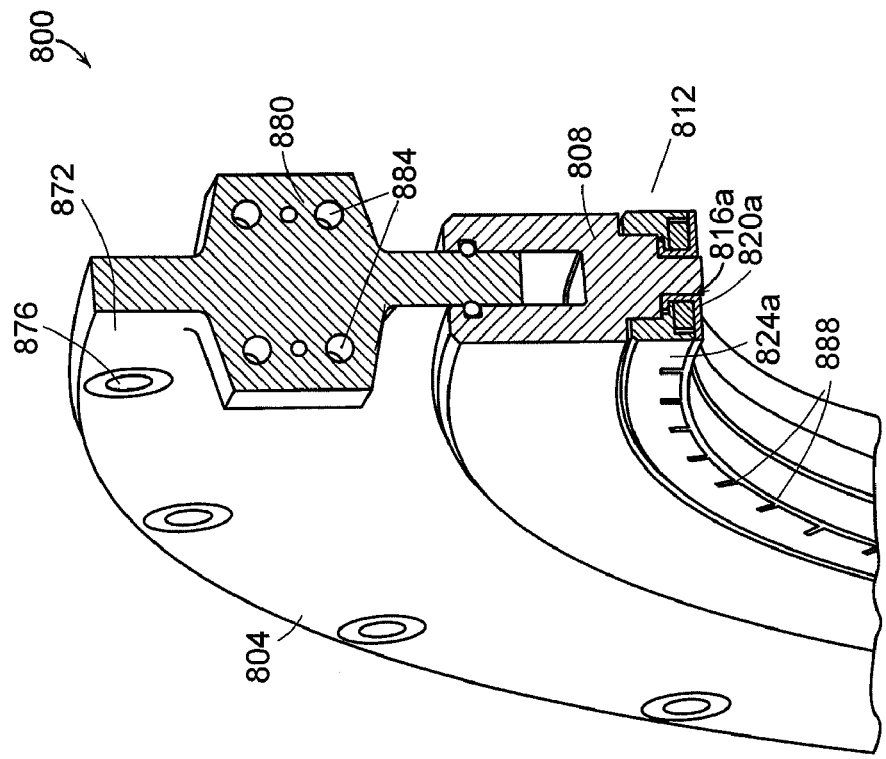
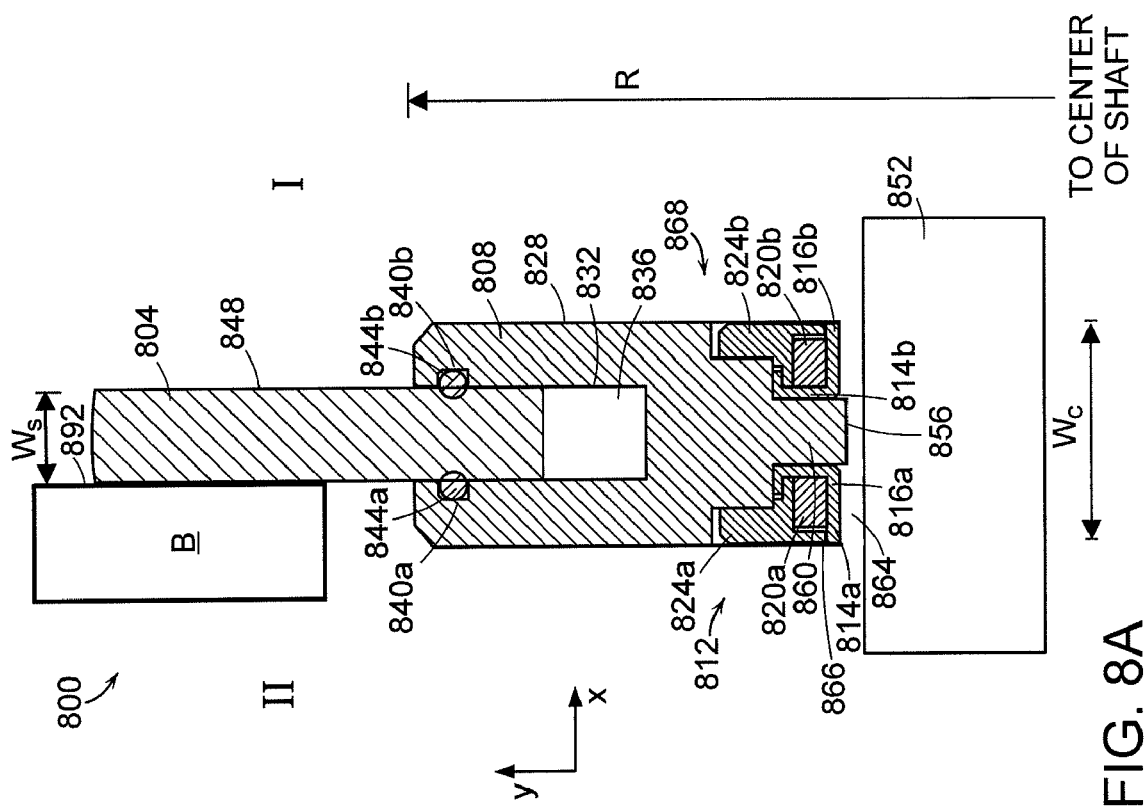
FIG. 8B
FIG. 8A

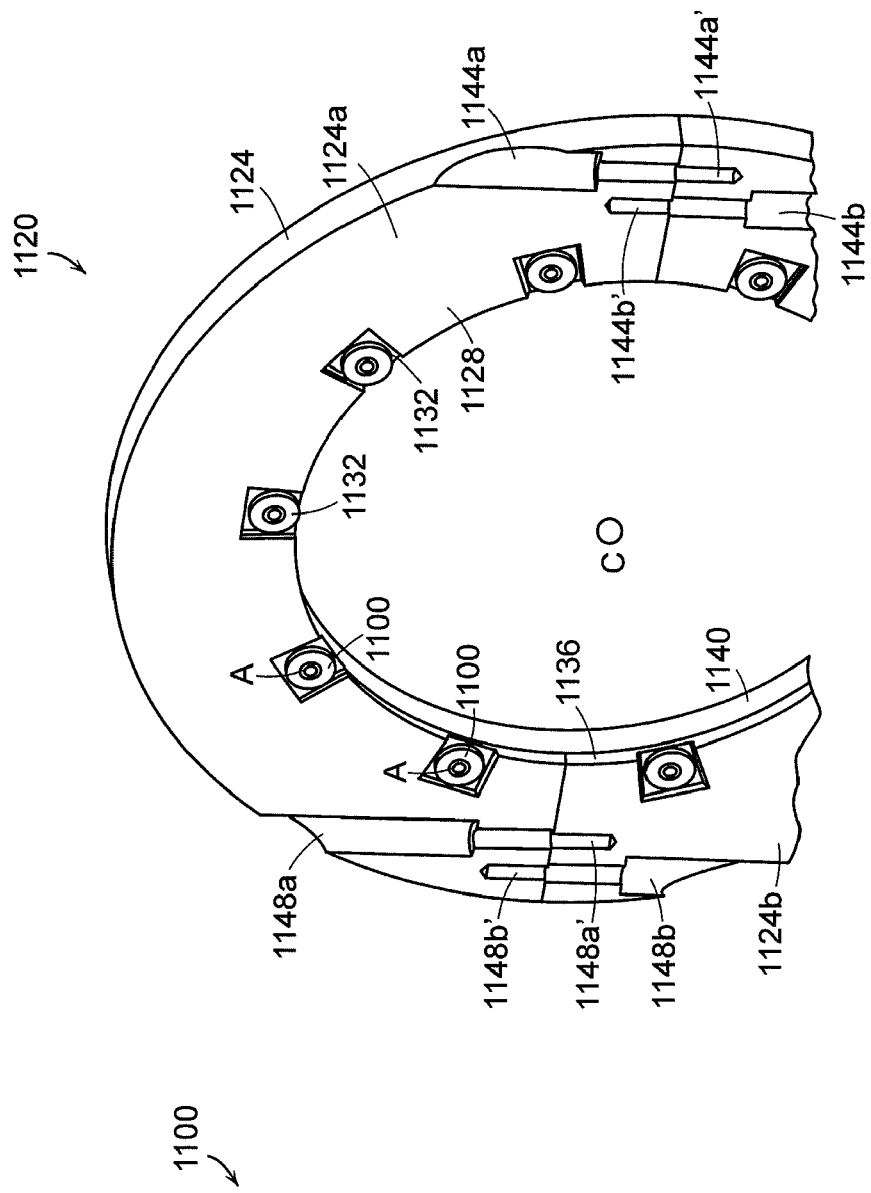
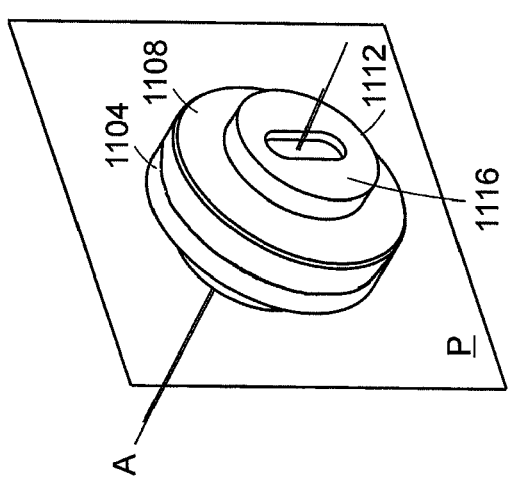
FIG. 11B
FIG. 11A

FLUID-ACTIVATED SHAFT SEAL

CROSS-REFERENCE TO RELATED APPLICATIONS

This application is a continuation-in-part of U.S. patent application Ser. No. 11/286,680, titled "Fluid-Activated Shaft Seal," which was filed Nov. 22, 2005 and which claims the benefit of U.S. Patent Application No. 60/629,911, filed Nov. 22, 2004, and the contents of both of which are hereby incorporated herein by reference.

GOVERNMENT SUPPORT

Portions of the concepts described herein were made or developed with government support under Contract Numbers N65538-04-M-0157 and N65540-05-C-0034. The federal government may have certain rights in such concepts.

TECHNICAL FIELD

The invention generally relates to seals, and, in particular, to fluid-activated shaft seals incorporating a gel material.

BACKGROUND

Many industrial applications require a shaft to pass from one area of a structure through a wall to another area of the structure. The shaft generally passes through an opening in the wall and moves relative to the position of the wall. For example, the shaft can translate, rotate, or move in some combination of translation and rotation (e.g., twisting, bending, or stretching) about an axis of the shaft through the surface. A spatial clearance generally exists between the shaft and the opening in the wall to facilitate this movement.

Some applications that involve moving shafts require fluid isolation between the separate areas of the structure so that a leak or contamination in one area of the structure does not migrate or flow to an adjacent area of the structure via the clearance between the shaft and the opening in the wall. For example, a propulsion shaft that extends along the length of the hull of a ship passes through several bulkheads that separate different compartments of the ship. Preventing a water leak in one compartment from advancing past a bulkhead into the next compartment along the shaft is critical in preventing the hull from filling with water and sinking the ship. Shaft seals are typically used to limit the flow of fluids from one compartment to the next during, for example, rotation of the shaft relative to the shaft opening in the ship structure.

An example of a conventional shaft seal designed to rotate as the shaft rotates during shaft operation is the ND-type shaft seal sold by Wartsila-Lips, Inc. of Poulsbo, Wash. The ND-type seal includes an o-ring positioned at a rubber molding-shaft interface, such that both the molding and the o-ring spin as the shaft spins. A pressure differential across the o-ring generated by an unequal amount of pressure on either side of a bulkhead causes the rubber molding to deform and press against the housing, which is positioned about the opening. Rotation of the molding is hindered when the molding presses against the housing. The stationary molding creates a seal against the housing and forces the o-ring into contact with the shaft. The o-ring also stops spinning and creates a fluid seal with respect to the shaft.

One drawback of the ND-type shaft seal is that contact between the sealing components and the shaft while the sealing components are dry leads to premature failure of the sealing components caused by the associated friction-induced wear on the o-ring and the rubber molding. Current shipbuilding specifications generally require a pressure differential between the opposing surfaces of the sealing components of about ⅓ psig (pounds per square inch gauge or about 234.1 kg/m$^2$), or roughly 8-9 inches (about 203-229 mm) of water before the seal engages the shaft. The presence of water assists in creating a water-tight interface between the shaft and the sealing components (e.g., the molding and the o-ring). The ND-type seals have activated (e.g., contacted the shaft) in the presence of as little as 0.6-0.9 inches (about 15.2-22.9 mm) of water. The sealing components contact the shaft while the sealing components are relatively dry and lead to premature wear. Additionally, a pressure differential insufficient to generate a fluid-tight seal develops between opposing sealing components when the sealing components are activated in the presence of relatively small quantities of water. When a fluid-tight seal does not develop, leakage rates associated with the shaft and sealing components can be in excess of shipbuilder specifications.

For example, shipbuilder specifications generally require self-activating bulkhead shaft seals with a maximum leakage rate of 0.5 U.S. pint/hour (about 0.065 ml/s). Self-activating shaft seals generally do not require human operation (e.g., adjustment of the seals) after installation with respect to a shaft and during a leak. For the DDG-type destroyer, the maximum leakage rate permitted under the shipbuilder specifications is 1 U.S. pint/minute (about 0.1314 ml/s). Activation of the seal in the presence of a relatively low pressure differential (e.g., premature activation caused by relatively low water levels discussed above) causes accelerated wear of the seal components. Accelerated wear of a seal leads to premature failure of the seal and noncompliance with shipbuilder specifications.

Hence, there is a need for self-activating shaft seals that do not prematurely activate in the presence of relatively small amounts of fluid. There also is a need for shaft seals designed to resist premature wear. There also is a need for shaft seals whose design can be scaled to effectively seal shafts of a variety of diameters. For example, there is a need for shaft seal designs for relatively small diameter shafts and relatively large diameter shafts, both of which can be found on destroyers or various industrial applications.

SUMMARY

The concepts described herein address these and other issues associated with current shaft seal designs by associating the seal with a gel material that expands when exposed to a fluid. In one embodiment, seal designs employing such materials generally are not in contact with the moving shaft in absence of a fluid. Separation between the seal and the shaft prolongs the life of the seal by reducing the effects of friction on the seal in the absence of a fluid. When the gel material expands, the seal is deformed and urged into contact with the shaft. Various features and advantages associated with such seals are described below.

The invention, in one aspect, relates to a system. The system includes a support component that defines an exterior surface which includes an interface to couple to a bulkhead structure. The system also includes a carrier component having an interior surface to slideably engage the exterior surface of the support component. The system includes a seal disposed relative to the carrier component. The seal includes a lip portion and a fluid-responsive gel material. The gel material expands when exposed to a fluid to urge the lip portion towards or into contact with a shaft and contracts in the absence of the fluid to form or increase the size of a gap between the shaft and the lip portion.

The invention, in another aspect, relates to a system for isolating a fluid in a first compartment from a second compartment where a shaft passes from the first compartment to the second compartment. The system includes a seal disposed relative to the shaft. The seal includes a lip portion and a fluid-responsive gel material that expands when exposed to the fluid to urge the lip portion towards or into contact with the shaft. The gel material contracts in the absence of the fluid to form or increase the size of the gap between the shaft and the lip portion.

In another aspect, the invention relates to a support component to isolate a fluid in a first compartment separated from a second compartment by a bulkhead where a shaft passes from the first compartment to the second compartment and where the fluid is isolated by a seal that includes a lip portion and a fluid-responsive gel material. The gel material expands when exposed to a fluid to urge the lip portion towards or into contact with the shaft and contracts in the absence of the fluid to form or increase the size of a gap between the shaft and the lip portion. The support component includes an annular structure that defines an interface surface to couple to the bulkhead when the support component is mounted to the bulkhead. The annular structure includes an exterior surface disposed relative to the interface surface. The exterior surface is for slideable engagement with a corresponding interior surface of a carrier component that positions the seal relative to the support component.

The invention, in another aspect, relates to a carrier component to position a seal that includes a lip portion and a fluid-responsive gel material. The gel material expands when exposed to a fluid to urge the lip portion towards or into contact with a shaft that passes through a bulkhead and that contracts in the absence of the fluid to form or increase the size of a gap between the shaft and the lip portion. The carrier component includes an annular body that defines a channel along an outer circumference of the body to slideably engage a corresponding exterior surface of a support component mounted to the bulkhead in response to movement of the shaft. The annular body defines an extensive portion along an inner surface of the body to couple and position the seal.

In another aspect, the invention relates to a method of sealing adjacent compartments separated by a bulkhead structure. The method involves securing an interface of a support component that defines an exterior surface to a corresponding interface of the bulkhead structure. The method also involves positioning an interior surface of a carrier component in slideable engagement with the exterior surface of the support component. The method involves coupling a seal relative to the carrier component. The seal includes a lip portion and a fluid-responsive gel material that expands when exposed to a fluid to urge the lip portion towards or into contact with a shaft and that contracts in the absence of the fluid to form or increase the size of a gap between the shaft and the lip portion.

The invention, in another aspect, relates to a system. The system includes an interface for coupling a support means to a corresponding interface of a bulkhead structure. The support means defines an exterior surface. The system includes a sealing means that includes a fluid-responsive gel material that reversibly changes volume in response to exposure to or absence of a fluid for regulating the size of a flow path between a portion of the sealing means and a shaft passing through the bulkhead structure. The system also includes a carrier means for positioning the sealing means relative to the support means. The carrier means defines an interior surface for slideably engaging the exterior surface of the support means.

The invention, in another aspect, relates to a system to isolate a fluid in a first compartment from a second compartment in which a shaft passes from the first compartment to the second compartment, where the fluid is isolated by a seal that includes a lip portion and a fluid-responsive gel material. The gel material expands when exposed to the fluid to urge the lip portion towards or into contact with the shaft and contracts in the absence of the fluid to form or increase the size of a gap between the shaft and the lip portion. The system includes a bulkhead structure defining a first surface in the first compartment, a second surface in the second compartment, and an opening passing from the first compartment to the second compartment. The first surface defines a first annular region, and the second surface defines a second annular region. The first and second annular regions are adjacent the opening and are for slideable engagement with a corresponding interior surface of a carrier component positioning the seal relative to the bulkhead structure.

In other examples and embodiments, any of the aspects above can include one or more of the following features. In some embodiments, the system or components include a retaining component to position and couple the seal relative to the carrier component. The retaining component can include a plate portion that couples the retaining component to the gel material. Expansion of the gel material urges the plate portion to correspondingly urge the lip portion of the seal towards or into contact with the shaft. The plate portion can also increase a distance the lip portion moves in response to expansion of the gel material.

In some embodiments, a set of o-rings is disposed between the exterior surface of the support component and the interior surface of the carrier component. The set of o-rings reduces a flow path from a first compartment to a second compartment separated by the bulkhead or bulkhead structure. In some embodiments, the bulkhead structure includes a housing portion, and the interface of the support component couples to the housing portion.

Some embodiments feature an alignment ring positioned relative to the carrier component to position the seal relative to the shaft. The alignment ring can be positioned relative to the extensive portion of the carrier component relative to the shaft. The alignment ring can include a low-friction or a low-wear material (or both). The alignment ring can also include a low-corrosion material. For example, the alignment ring can be formed from or coated with a low-wear, low-friction, and/or low-corrosion material. In some embodiments, the lip portion of the seal can include a low-friction or a low-wear material (or both). The lip portion of the seal can also include a low-corrosion material. In some embodiments, the lip portion of the seal is formed from or coated with a low-wear, low-friction, and/or low-corrosion material. The low-wear material can reduce wear on the alignment ring, the lip portion of the seal, the shaft, or a combination of all three. The low-friction material can reduce friction between the alignment ring and the shaft or between the lip portion of the seal and the shaft. In some embodiments, the shaft is a composite shaft. The shaft can also be made from a metal or metallic alloys.

A set of bearings can be disposed within a portion of the carrier component and positioned relative to the shaft. Each bearing in the set of bearings is rotatable in response to contact and/or rotation by the shaft. The set of bearings can center the seal relative to the shaft. A set of bushings corresponding to the set of bearings can be used to secure the set of bearings to the carrier component. In some embodiments, each of the bearings includes a coating disposed on a surface thereof. Some embodiments feature a rotating shaft. The extensive portion of the carrier component can include a recessed region. The set of bearings can be disposed within the recessed region to rotatably engage the shaft. In some embodiments, the set of bushings, corresponding to the set of bearings, secures the set of bearings to the carrier component. Each of the bushings can define a bushing surface that is substantially co-planar with an exterior surface of the extensive portion of the carrier component.

In some embodiments, the seal includes a fluid-permeable hard open cell foam or a fluid-permeable soft open cell foam. The gel material can be embedded in the hard or soft open cell foam. Expansion and contraction of the gel material is a reversible effect. For example, the reversible effect includes the gel material expanding in response to the temperature of the gel falling below a phase transition temperature of the gel material. The reversible effect can also involve the gel material contracting in response to the temperature of the gel exceeding a phase transition temperature of the gel material.

Contact with the shaft can refer to nominal contact with the shaft or engagement with the shaft, including by the lip portion, the alignment ring, the set bearings, or a combination of these. Forming the gap between the shaft and the lip portion involves the lip portion moving out of contact with the shaft. Increasing the size of the gap between the shaft and the lip portion involves the lip portion moving away from the shaft.

In some embodiments, the exterior surface of the support component defines two substantially parallel surfaces. The substantially parallel surfaces can be substantially opposite facing (e.g., one surface can face towards a first compartment and the other surface can face towards a second compartment separated by a bulkhead structure). The first and second surface of the bulkhead structure can also be substantially parallel, opposite-facing surfaces.

The invention, in another aspect, relates to a system. The system includes a flexible body that defines an interface surface along an outer diameter of the flexible body. The system also includes a sealing structure that is disposed along an inner diameter of the body. The sealing structure includes a lip portion and a gel material that expands when exposed to a fluid to urge the lip portion towards or into contact with a shaft. The gel material contracts in the absence of the fluid to form or increase the size of a gap between the shaft and the lip portion.

In some embodiments, the system includes an annular structure that is removably securable to the flexible body (e.g., to the outer diameter of the flexible body) to couple the interface surface to a carrier component or a support component. The flexible body, in some examples, features an extensive portion disposed along the inner diameter of the flexible body. A ring can be coupled to the extensive portion. The ring can be made from or coated with a low-friction, low-wear, or low-corrosion material (or a combination of such materials). In some embodiments, the sealing structure is a backup seal. The sealing structure can be formed integrally with the flexible body, or the sealing structure can be formed separately from the flexible body and coupled thereto (e.g., by bonding).

The invention, in one aspect, features a system that includes a housing and a seal disposed relative to the housing. The seal includes a gel material that expands when exposed to a fluid for reducing a flow of the fluid through a gap or clearance between the housing and a shaft. The seal includes a lip portion and expansion of the gel material urges the lip portion into contact with the shaft.

In some embodiments, the seal reduces the flow area associated with the gap between the housing and the shaft. In some embodiments, the seal is urged into contact with the shaft by the expansion of the gel material and substantially eliminates the flow area (e.g., by closing the gap). In some embodiments, the gel material is adapted to contract in the absence of a fluid for at least one of forming or increasing the gap between the seal and the shaft. In one embodiment, after fluid is removed from the compartment, the gel material dries out and contracts to permit the seal to deform back to the original shape the seal occupied before exposure to the fluid. In some embodiments, expansion of the gel material is a reversible process or effect. In some embodiments, the shaft passes through a bulkhead (e.g., a propeller shaft that passes through the hull of a vessel). In some embodiments, the gel material is formed by embedding gel particles into an open cell foam. In some embodiments, the open cell foam is a hard open cell foam or a soft open cell foam. In some embodiments, the open cell foam is shaped to fit within a pocket of the seal.

In some embodiments, the seal includes a lip seal. The seal or the lip seal can include an elastomeric material, a natural rubber material, or a synthetic rubber material. In some embodiments, the seal includes a low-wear material to reduce wear between the seal and the shaft or a low-friction material to reduce friction between the seal and the shaft. The low-wear material can be a Teflon® material, for example, molded, bonded, coated, or otherwise secured or applied to the seal. The low-wear material reduces wear between the shaft and the seal that may occur during long-term contact between the shaft and the seal. In some embodiments, the system includes an alignment ring adapted to align the seal relative to the housing, the shaft, or both. In some embodiments, the alignment ring includes a contact surface with respect to the shaft, and a low-wear material. In some embodiments, the low-wear material comprises a Teflon® material. In some embodiments, the low-wear material is secured with respect to the seal by at least one of bonding, seating, fitting, coupling, or any combination of these. In some embodiments, the seal captures the low-wear material, for example, through a groove, a pocket, interference fit (e.g., a diametral interference fit), or a friction fit. The alignment ring can be formed from a low-wear or a low-friction material, for example, a Teflon® material. The alignment ring can also be coated with a low-wear or a low-friction material.

In some embodiments, the system includes a second seal that comprises a second gel material that expands when exposed to the fluid and reduces the flow of the fluid through the gap between the housing and the shaft. In some embodiments, the seal reduces the flow of the fluid through the gap between the housing and the shaft along a first direction and the second seal reduces a second flow between the housing and the shaft along a second direction. In some embodiments, the second direction is substantially opposite the first direction.

In some embodiments, the seal is a backup seal. The seal can reduce the flow of the fluid between the housing and the shaft during motion of the shaft (e.g., rotation, translation, or any combination of these) relative to the housing. In some embodiments, a pressure differential is maintained across the seal when the seal is exposed to the fluid. The pressure differential can improve the performance of the seal, for example, by interacting with the gel material and causing the gel material to expand.

The invention, in another aspect, features a method for reducing a flow of a fluid between a shaft and a housing. The method involves installing the housing in an opening relative to a shaft. The method also involves locating a seal relative to the housing. The seal comprises a gel material that expands when exposed to the fluid and reduces a flow of the fluid through a gap between the housing and the shaft.

In some embodiments, the method involves installing at least one alignment ring adapted to align the seal relative to the housing, the shaft, or both. In some embodiments, the method involves coupling an alignment ring to the seal for aligning the housing relative to the seal. In some embodiments, the method involves installing a second seal comprising a second gel material that expands when exposed to the fluid reduces a second flow of the fluid through the gap between the housing and the shaft. In some embodiments, the method involves installing a second alignment ring adapted to align the seal relative to the housing, the shaft, or both. In some embodiments, the method involves securing a low-wear material with respect to the seal, and securing includes at least of bonding, seating, fitting, coupling, or any combination of these. In some embodiments, securing includes the seal capturing the low-wear material, for example, through a groove, a pocket, interference fit (e.g., a diametral interference fit), or a friction fit.

The invention, in another aspect, features a system that includes a housing disposed relative to a shaft, and a means for reducing a gap between the housing and the shaft in response to exposure to a fluid. The means for reducing the gap includes a fluid-responsive gel material.

The invention, in another aspect, features a system that includes a housing and a seal disposed relative to the housing. The seal includes a gel material that expands when exposed to a fluid for reducing a flow of the fluid through a gap between the housing and a structure.

In some embodiments, a portion of the seal is not in contact with the structure in the absence of fluid, for example, to reduce wear associated with friction on components of the system such as the seal. In some embodiments, a portion of the seal contacts the structure when the seal is exposed to the fluid. In some embodiments, the seal includes a lip portion and expansion of the gel material urges the lip portion into contact with the structure.

In other embodiments of the invention, any of the aspects above can include one or more of the above features. One embodiment of the invention can provide all of the above features and advantages.

These and other features will be more fully understood by reference to the following description and drawings, which are illustrative and not necessarily to scale.

BRIEF DESCRIPTION OF THE DRAWINGS

FIG. 8A is a cross-sectional view of a portion of a system, according to an illustrative embodiment of the invention.

FIG. 8B is a partial cross-sectional perspective view of a portion of the system of FIG. 8A.

FIG. 11A is a perspective view of a bearing, according to an illustrative embodiment of the invention.

FIG. 11B is a partial cross-sectional perspective view of a system including a carrier component having a plurality of the bearings of FIG. 11A installed therein.

DETAILED DESCRIPTION

Figure 1:
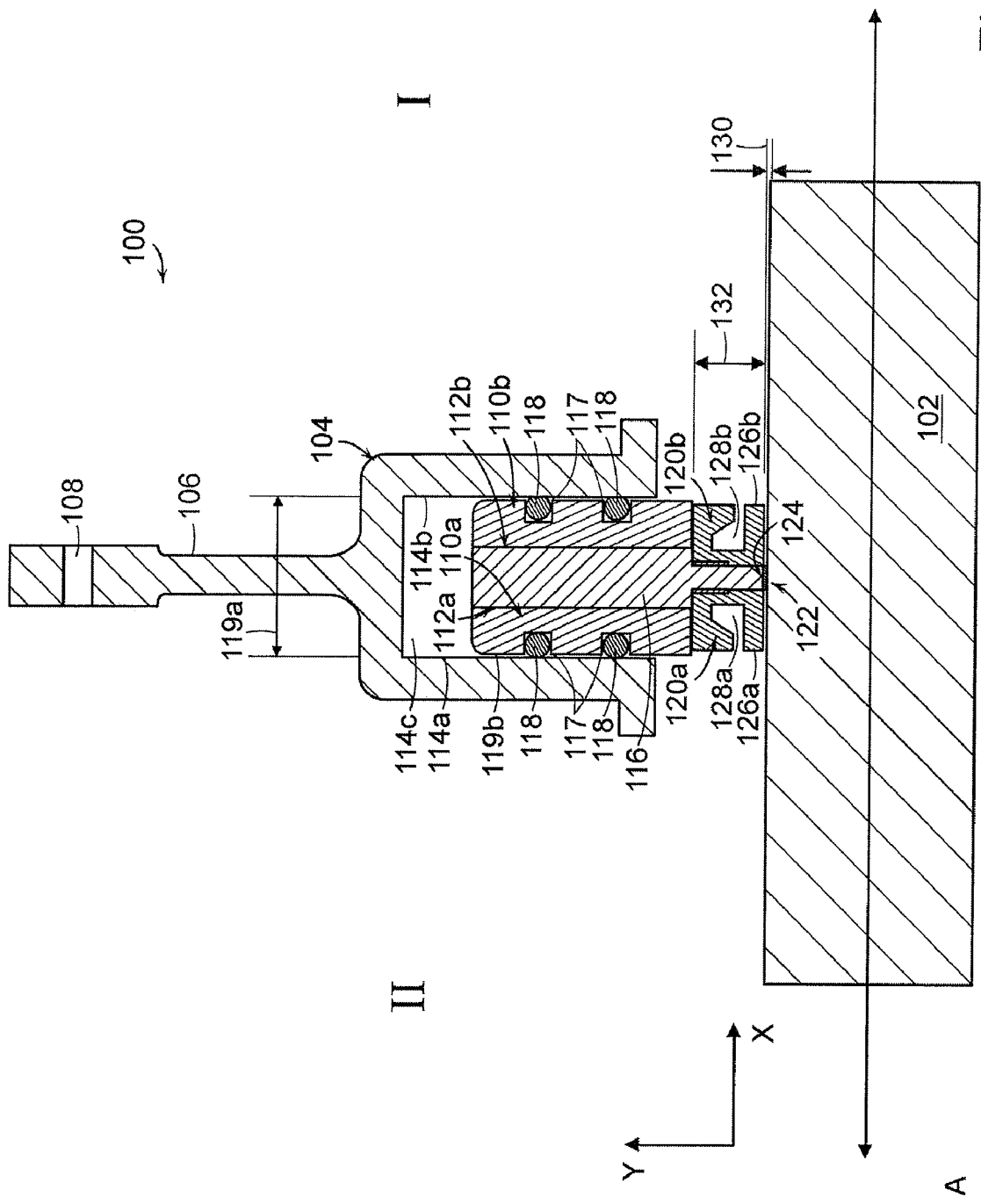
FIG. 1 is a cross-sectional view of a portion of a system that reduces a flow of a fluid between a shaft and a housing that embodies the invention.

FIG. 1 is a cross-sectional view of a system 100 that reduces a flow of a fluid between a shaft and a housing that embodies the invention. The system 100 is designed for installation and use with a shaft 102 that defines a longitudinal axis A. The system 100 includes a housing 104 coupled to an extensive portion 106 that defines one or more through-holes 108. The system 100 can be secured or mounted fixedly with respect to the shaft 102, for example, by passing one or more bolts through the through-holes 108 to corresponding holes (not shown) on a support surface or bulkhead (not shown). In some embodiments, the bolts thread directly into the corresponding holes. In some embodiments, the corresponding holes are instead through-holes, and the system 100 is secured by threading the bolts securely to one or more nuts on the opposite side of the support surface or bulkhead (e.g., in a different area of the structure).

The system 100 features two connection plates 110a and 110b disposed within the housing 104. The connection plates 110a and 110b define two surfaces 112a and 112b. Surface 112a of connection plate 110a faces an interior surface 114b of the housing 104. Surface 112b of connection plate 110b faces an interior surface 114a of the housing 104. The system 100 includes an alignment ring 116. The alignment ring 116 is designed to fit relatively between the surfaces 112a and 112b of the connection plates 110a and 110b. The combination of the connection plates 110a and 110b and the alignment ring 116 are designed to fit relatively loosely between the surfaces 114a and 114b of the housing 104. The connection plates 110a and 110b define annular grooves 117. The alignment ring 116 defines corresponding annular grooves (not shown) for housing one or more o-rings 118. In some embodiments, the annular grooves of the alignment ring 116 cooperate with the annular grooves 117 of the connection plates 110a and 110b to form a substantially continuous annular groove for seating the o-rings 118. In some embodiments, the alignment ring 116 is manufactured from or coated with a low-wear or low-friction material, for example, a Teflon® material.

The combined thickness of the connection plates 110a and 110b and the alignment ring 116 is slightly less than distance 119a of the housing 104 (i.e., the distance along the X-axis between the surfaces 114a and 114b). A slight clearance 119b exists between the housing 104 and the combination of the alignment ring 116 and the connection plates 110a and 110b. The o-rings 118 provide a seal between the combination of the connection plates 110a and 110b and the alignment ring 116 and the housing 104 to hinder fluid from entering an interior region 114c of the housing 104. Additionally, the o-rings 118 allow the connection plates 110a and 110b and the alignment ring 116 to flex or move relative to the shaft 102 to accommodate, for example, translations of the shaft 102 along the Y-axis without overstressing the housing 104 (e.g., the extensive portion 106, the through-holes 108, or the surface to which the housing 104 is secured). In some embodiments, the shaft 102 moves with respect to the housing 104 (e.g., a propeller shaft on a ship). The shaft 102 can move by translation or rotation or some combination of translation and rotation (e.g., twisting) with respect to the housing 104. In some embodiments, the shaft 102 is stationary with respect to the housing 104. Examples of stationary shafts include conduits, pipes, electrical cables, and other structures that pass through a surface.

The system 100 also features two seals 120a and 120b positioned relative to the shaft 102. The seals 120a and 120b are positioned in abutting relation to the connection plates 110a and 110b and the alignment ring 116. In some embodiments, the seals 120a and 120b are coupled to the alignment ring 116, for example, by bonding the seals 120a and 120b to the alignment ring 116. In some embodiments, the seals 120a and 120b and the alignment ring 116 are a unitary structure formed from the same material. A ring 122 is disposed between the shaft 102 and a bottom face 124 of the alignment ring 116.

In some embodiments, the ring 122 is made from or coated with a Teflon® material or other low-wear or low-friction material. During assembly and in operation, the ring 122 can be used to align the various components of the system 100. For example, the ring 122 can align the alignment ring 116 and the connection plates 110a and 110b with respect to the housing 104 and the shaft 102. In some embodiments, the ring 122 is not included in the system 100. In some embodiments, the ring 122 is coupled to the shaft 102 such that the ring 122 moves (e.g., rotates or translates) as the shaft 102 moves. In some embodiments, a gap between the ring 122 and the shaft 102 is sufficiently small to reduce an air or fluid flow through the gap. In some embodiments, the ring 122 or other low-wear or low-friction material is secured with respect to the seals 120a and 120b, for example, by bonding, seating, fitting, coupling, or some combination of these. In some embodiments, the seals 120a and 120b can be formed from or coated with a low-wear or low-friction material. The ring 122 or other low-wear material can be captured by the seals 120a and 120b, for example, by a groove (not shown), a pocket (not shown), or other types of fits, such as a diametral interference fit or a friction fit.

In this embodiment, the ring 122 has a thickness of about 0.1 mm (along the Y-axis), approximately equal to the radial clearance 130 between the lips 126a and 126b of each of the seals 120a and 120b relative to the shaft 102. Some embodiments feature a radial clearance 130 between the lips 126a and 126b and the shaft 102 that is greater than the thickness of the ring 122. In some embodiments, the clearance 132 between the shaft-facing surface of the lips 126a and 126b of the seals 120a and 120b and the connection plate-facing surface of the seals 120a and 120b is about 25 mm. In some embodiments, the clearance 132 is approximately 12.7 mm. Alternate geometries and dimensions are contemplated and within the scope of the invention.

The seals 120a and 120b each define a pocket 128a and 128b, respectively. The pockets 128a and 128b are filled with a gel material (also referred to herein as a gel). In some embodiments, the gel material is a hydrogel, an acrylamide gel (e.g., a "smart" gel), or other gels that expand in the presence of a fluid. In some embodiments, the seals 120a and 120b comprise a pliable or bendable material, for example, an elastomeric material, a natural rubber material, or a synthetic rubber material.

In some embodiments, the seal comprises a material having a hardness of about Shore A60. In general, the gel material expands when exposed to a fluid and reacts against the interior surfaces of the pockets 128a and 128b. Because the seals 120a and 120b are pliable, as the gel material expands, the lips 126a and 126b of the seals 120a and 120b are urged into contact with the shaft 102 to form a sealing arrangement. In this manner, the lips 126a and 126b reduce or eliminate the flow area associated with the clearance 130 between the lips 126a and 126b and the shaft 102. In some embodiments, the seals 120a and 120b include a low-wear or low-friction material, for example a Teflon® material to reduce wear or friction between the seals 120a and 120b and the shaft 102. For example, the low-wear material can be secured or applied (e.g., molded, bonded, or surface coated) to the lips 126a and 126b.

Tests have shown that in one embodiment, the gel material can produce more than about 37 psi (about 26,010 kg/m$^2$) of pressure against the lips 126a and 126b in forcing the lips 126a and 126b into contact with the shaft 102.

In this embodiment, the system 100 defines a first compartment I and a second compartment II that are generally not in fluid communication with each other. Compartment I is separated from compartment II by, for example, a surface (e.g., a bulkhead of a ship) coupled to the housing 104. Exemplary operation of the system 100 occurs when a fluid leak occurs in a first compartment I. A pressure differential develops between the first compartment I and a second compartment II. The fluid tends to migrate from the first compartment I to the second compartment II via the clearance 130 between the seals 120a and 120b and the shaft 102.

In some embodiments, the fluid contacts the gel material disposed in the pocket 128b (e.g., by splashing or inundation), causing the gel material to expand and react against the inside surface of the pocket 128b to urge the lip 126b into contact with the shaft 102. In some embodiments, the gel material expands and urges the lip 126b into contact with the shaft 102 within several seconds after exposure of the gel material to the fluid. The system 100 can be used with a variety of naturally-occurring or synthetic fluids, for example, freshwater, salt water, acids, alkaline fluids, blood or other biological fluids, and oils. In general, the type of fluid that is present influences the choice of gel material used in the system 100. Gel materials can respond (e.g., expand and contract) based, in part, on properties of the fluid.

Generally, the seal 120b is not activated (i.e., the lip 126b does not move towards the shaft 102) until fluid is present because the gel material does not expand in the absence of a fluid. When the lip 126b is in contact with the shaft 102, the clearance 130 or gap between the lip 126b and the shaft 102 is reduced, which reduces the flow area through which the migrating fluid passes. The pressure differential between the first compartment I and the second compartment II is increased as the lip 126b approaches or comes into contact with the shaft 102. In some embodiments, the ability of the lip 126b to reduce the flow through the clearance 130 increases as the pressure differential between the first compartment I and the second compartment II increases. The o-rings 118 hinder fluid from migrating from the first compartment I to the second compartment II through the housing 104 by sealing the combination of the alignment ring 116 and the connection plates 110a and 110b with respect to the inside surfaces 114a and 114b of the housing 104.

In some embodiments, the pressure differential that occurs when the lip 126b engages the shaft 102 also operates on the gel material disposed in the pocket 128a of the seal 120a that faces the second compartment II. The pressure differential causes the gel material in the pocket 128a to expand, and force the lip 126a to also engage the shaft 102. In some embodiments, the lip 126a of the seal 120a forms a backup seal to hinder fluid from entering the second compartment II if the seal 120b (e.g., the lip 126b) facing the first compartment I fails (e.g., due to wear). In some embodiments, some fluid migrates from the first compartment I to the second compartment II and contacts or wets the gel material disposed in the pocket 128a. When the gel material in the pocket 128a is exposed to the fluid, the lip 126a of the seal 120a moves towards and/or into contact with the shaft 102. In this manner, fluid in the second compartment II is hindered from migrating back to the first compartment I by the operation of the seal 120a.

After the seals 120a and 120b have been activated by exposure to a fluid, the lips 126a and 126b remain in contact with the shaft 102 until the fluid is removed and the seals 120a and 120b are dried (e.g., by the application of heat). In some embodiments, the seals 120a and 120b are dried by exposure to air. The gel material contracts in the absence of a fluid, for example, when the gel material is dried. As the gel material contracts, the seals 120a and 120b deform back to the original shape that the seals 120a and 120b occupied prior to exposure to the fluid (e.g., prior to the leak). The system 100 can be used for multiple leaks without being replaced because expansion of the gel material is a reversible effect (e.g., by contraction of the gel material).

Generally, a gel is a colloid material in which dispersed particles couple to the dispersion medium to form a semisolid material. Gels are sometimes classified according to the dispersion medium associated with the gel. For example, the dispersion medium for a hydrogel is water, and the dispersion medium for an acrylamide gel is acetone.

Gel materials used in some embodiments of the invention are generated by immersing polymer strands (e.g., gel particles) into a solution (e.g., water or acetone). In some embodiments, gel particles are suspended in the dispersion medium. In some embodiments, a gel changes volume (e.g., expands or contracts) in response to the environment to which the gel is exposed. The change in volume of the gel material is directly proportional to a property of the gel material known as Osmotic pressure. Osmotic pressure depends on a variety of factors, for example, temperature, ionization of the dispersion medium, concentration of the solution (e.g., of acetone), or the external forces (e.g., pressure) acting on the gel material. Generally, the gel seeks to occupy the state with lowest thermodynamic energy (e.g., lowest Osmotic pressure). In the absence of external forces (e.g., Osmotic pressure of 0 $N/m^2$), the gel collapses unto itself. For example, some acrylamide gels (also called "smart gels") can reduce in volume by a factor of about 1,000 when exposed to appropriate external conditions sufficient to cause a phase change in the smart gel.

In general, environmental changes affect a gel material by causing the gel to undergo a reversible volumetric change. Such environmental changes include changes in temperature, pH of the fluid, ionic strength of the fluid, light, and electromagnetic fields in the presence of the gel. The environmental changes generally cause the volume of the gel material to expand or contract in response to changes in the environment. The range of environmental values over which the gel material experiences volumetric change can be referred to as the environmental volume phase transition region of the gel and varies depending on the type of gel material. By way of example, a particular gel may contract as the temperature of the gel or a fluid in contact with the gel increases. Similarly, the gel may expand as the temperature of the gel or fluid in contact with the gel decreases.

In some embodiments, a gel material is selected for use in the system 100 based on the gel's ability to undergo a "discontinuous" volume change. Discontinuous volume changes involve a reversible transition by the gel material from the expanded to the contracted (or collapsed) state and back again. In some embodiments, the volume change is a substantial volume change in response to a relatively small change in the environmental condition. In some embodiments, temperature changes of less than about 0.1° C. result in a discontinuous volume change. Such gel materials may be referred to as "phase-transition gels." The environmental condition can be referred to as the "phase transition temperature" because the gel undergoes volumetric change at or about the phase transition temperature. In some embodiments, as the temperature drops to below the phase transition temperature, the gel material expands and urges the lips 126a and 126b into contact with the shaft 102. In some embodiments, absence of a fluid or as the temperature rises above the phase transition temperature causes the gel material to contract and permits the lips 126a and 126b to deform away from the shaft 102.

In some embodiments, the gel material (e.g., pellets or packets of gel material) is embedded into a foam material. In some embodiments, the foam material is an open cell foam material. In some embodiments, the open cell foam material is a soft open cell foam material. Examples of suitable open-cell foam materials include urethane foam or low-density polyurethane foam, for example, sold by Rynel, Inc. of Boothbay, Me.

In some embodiments, less gel material is used when a foam material is used because the foam material occupies space within the pockets 128a and 128b. The foam material is used as a containment vehicle for the gel material (e.g., individual gel particles or polymer strands) and can prevent migration of the gel material. In some embodiments, the gel material within the foam expands when exposed to a fluid. The expansion of the gel causes the foam to expand. The expanding foam reacts against the pockets 128a and 128b of the seals 120a and 120b to deform the seals 120a and 120b and urge the lips 126a and 126b into contact with shaft 102.

In some embodiments, the gel material is disposed within a liquid permeable sleeve or tube (not shown). The sleeve can be placed within the pockets 128a and 128b of the seals 120a and 120b. In some embodiments, the sleeve is made from a mesh material that permits water to permeate in and out of the sleeve but prevents the gel material from permeating out of the sleeve. A sleeve containing gel material can be made and used in seals having a variety of geometries because the sleeve and gel material can assume the shape of the seal or pockets of the seal. In some embodiments, a greater amount of gel material can be contained in a sleeve than could otherwise be embedded in a foam material.

Figure 2:
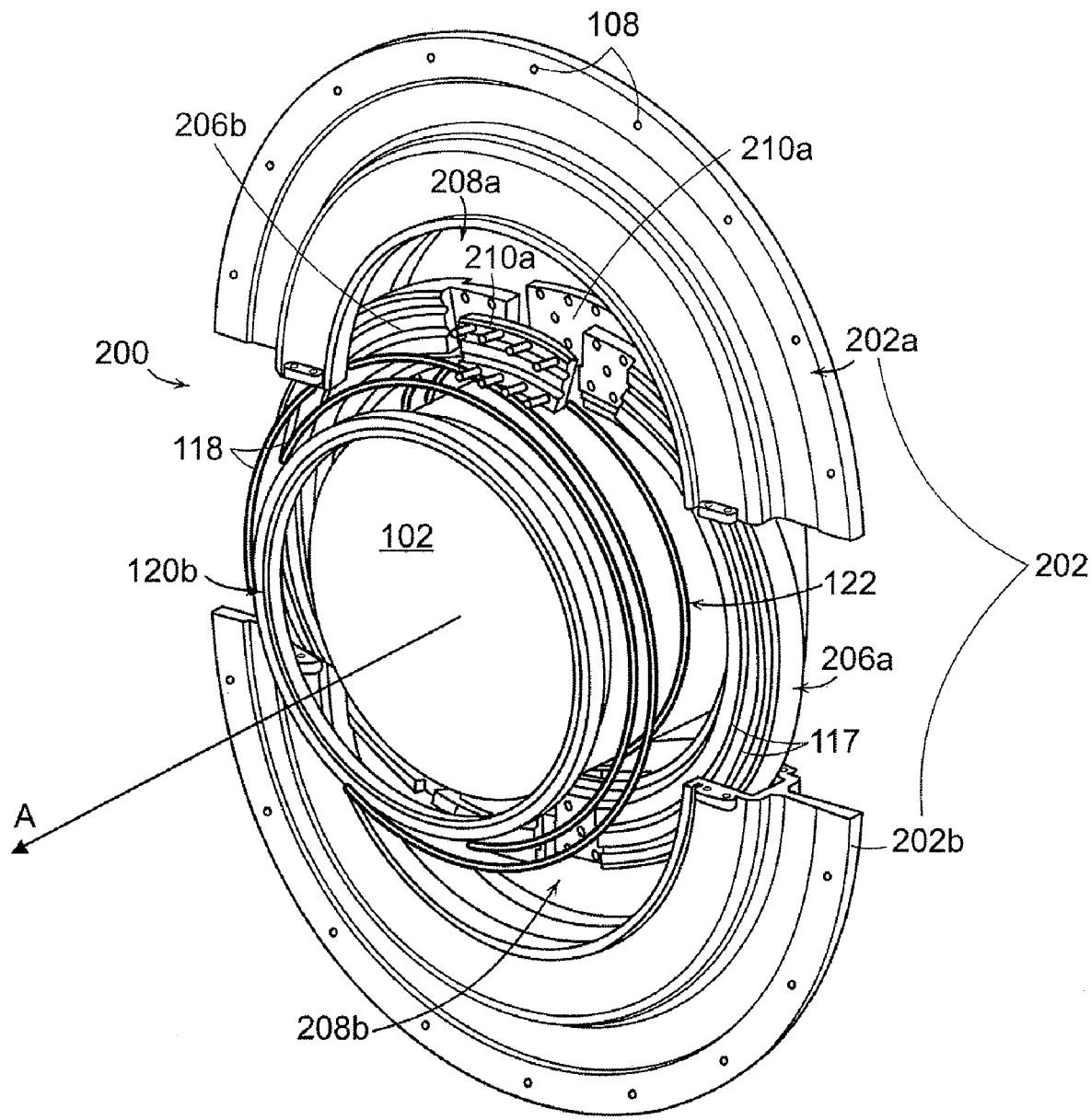
FIG. 2 is an exploded perspective view of a system that reduces a flow of a fluid between a shaft and a housing that embodies the invention.

FIG. 2 is an exploded perspective view of a system 200 that reduces a flow of a fluid between a shaft 102 and a housing. The system 200 includes two housing portions 202a and 202b that cooperate to form a single housing (collectively 202) disposed circumferentially about the shaft 102. The shaft 102 defines a longitudinal axis A. Each of the housing portions 202a and 202b define a plurality of through-holes 108 for securing the housing portions 202a and 202b to a surface or a bulkhead (not shown) through which the shaft 102 passes. Each of the housing portions 202a and 202b are a one-half ring-shaped structure each circumscribing approximately one-half of the shaft 102. Other configurations for the housing portions are possible (e.g., one-quarter-circles or one-third circles) for disposing the housing 202 about the shaft 102.

The system 200 includes two alignment rings 206a and 206b that cooperate to form a single alignment ring disposed within the housing 202 and circumferentially about the shaft 102. The alignment rings 206a and 206b are secured with respect to each other by connections 208a and 208b. The connection 208a features two connection plates 210a and 210b. An identical set of connection plates are used for the connection 208b (hidden in perspective). A plurality of connectors 212 (e.g., bolts, screws, rivets, or fasteners) pass through the first connection plate 210a, a portion of either or both of the alignment rings 206a and 206b, and the second connection plate 210b, and are axially secured to form a tight fit among the components. In some embodiments, the alignment rings 206a and 206b are fitted tightly together to form the alignment ring (e.g., with a friction fit).

Each of the alignment rings 206a and 206b and the connection plates 210a define annular grooves 117 (e.g., the annular grooves 117 of FIG. 1) for accommodating o-rings 118. Similarly, each of the alignment rings 206a and 206b and the connection plates 210b define annular grooves 117 (hidden in perspective) for accommodating o-rings 118 (hidden in perspective) on the opposite face along the axis A of the alignment rings 206a and 206b and connection plates 210b. The o-rings 118 are circumferentially continuous about the shaft 102 within the annular groove 117. In some embodiments, the o-rings 118 are not circumferentially continuous (e.g., they are split o-rings) to enable positioning about the shaft 102 without sliding the o-rings 118 over the length of the shaft 102 (e.g., to a location mid-shaft).

The system 200 also includes a ring 122 and seals 120a and seal 120b disposed circumferentially about the shaft 102. For clarity of illustration purposes, the seal 120a is not shown. The ring 122 and the seal 120b are circumferentially continuous about the shaft 102. In some embodiments, neither the alignment ring 122 nor the seal 120b is circumferentially continuous to enable positioning about the shaft 102 mid-shaft similar to the split o-ring.

Figure 3:
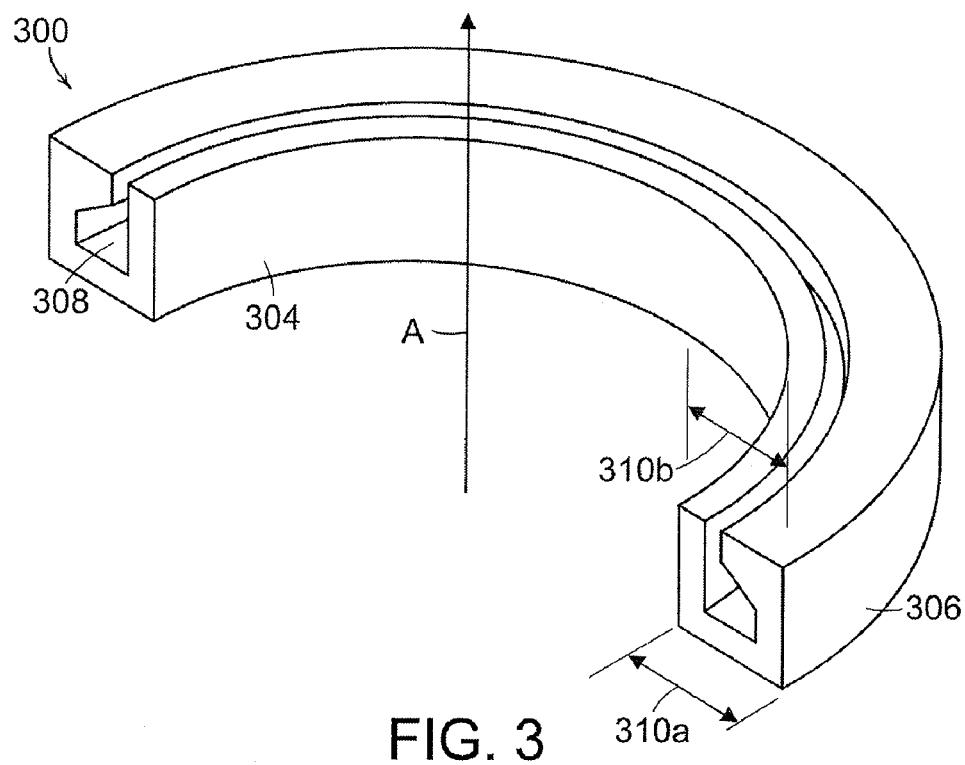
FIG. 3 is a cross-sectional perspective view of a lip seal including a pocket designed to contain a gel material, according to an illustrative embodiment of the invention.

FIG. 3 is a cross-sectional perspective view of a lip seal 300 including a pocket 308 designed to contain a gel material that embodies the invention. The seal 300 is illustrated as a half circle for disposing about a shaft (not shown) along the longitudinal axis A (e.g., the longitudinal axis A of the shaft 102 of FIGS. 1 and 2. In some embodiments, the seal 300 is formed of an elastomer or a rubber material. In some embodiments, the seal 300 is a unitary structure and forms a substantially continuous ring for disposing about the shaft. In some embodiments, the seal 300 may be formed of one or more components that cooperate to form a substantially continuous ring.

The seal 300 includes a first surface 304 for disposing adjacent the shaft and a second surface 306 for reacting against an external component (e.g., the alignment ring 116, the connection plate 110, the housing 104, or a combination of these components of FIG. 1). The seal 300 defines a pocket 308 designed to house or contain a gel material (not shown) that expands in the presence of a fluid. When a fluid is present, the gel material expands and reacts against the interior of the pocket 308.

In some embodiments, the seal 300 is formed of a material sufficiently rigid to prevent the first surface 304 from engaging the shaft in the absence of a fluid. The material is sufficiently pliable to permit expansion of the gel material to deform the seal 300 in the presence of a fluid such that the first surface 304 engages the shaft. For example, the seal may be formed of an elastomer material or a rubber material (e.g., natural or synthetic rubber). Because the second surface 306 reacts against the relatively fixed external component (e.g., the housing 202 or alignment rings 206a and 206b of FIG. 2), the first surface 304 expands substantially radially toward the shaft that is aligned with the axis A.

In one embodiment, tests have shown that in the absence of fluid, the distance 310a is about 12.7 mm, and the distance 310b is about 14.6 mm, providing a clearance or gap relative to the shaft of about 1 mm from the seal. When fluid was present, the gel material in the pocket 308 deformed the seal 300. The distance 310a remained approximately the same (i.e., about 12.7 mm). The distance 310b expanded to about 16.5 mm, sufficient to overcome the gap of about 1 mm clearance between the seal 300 and the shaft. In this embodiment, the expansion of the distance 310b exceeded about 16.5 mm when an external component (e.g., the housing 202 or the alignment rings 206a and 206b of FIG. 2) was in contact with the second surface 306. The greater expansion provides a stronger (e.g., reinforced) and more robust sealing interface between the seal 300 and the shaft.

Figure 4:
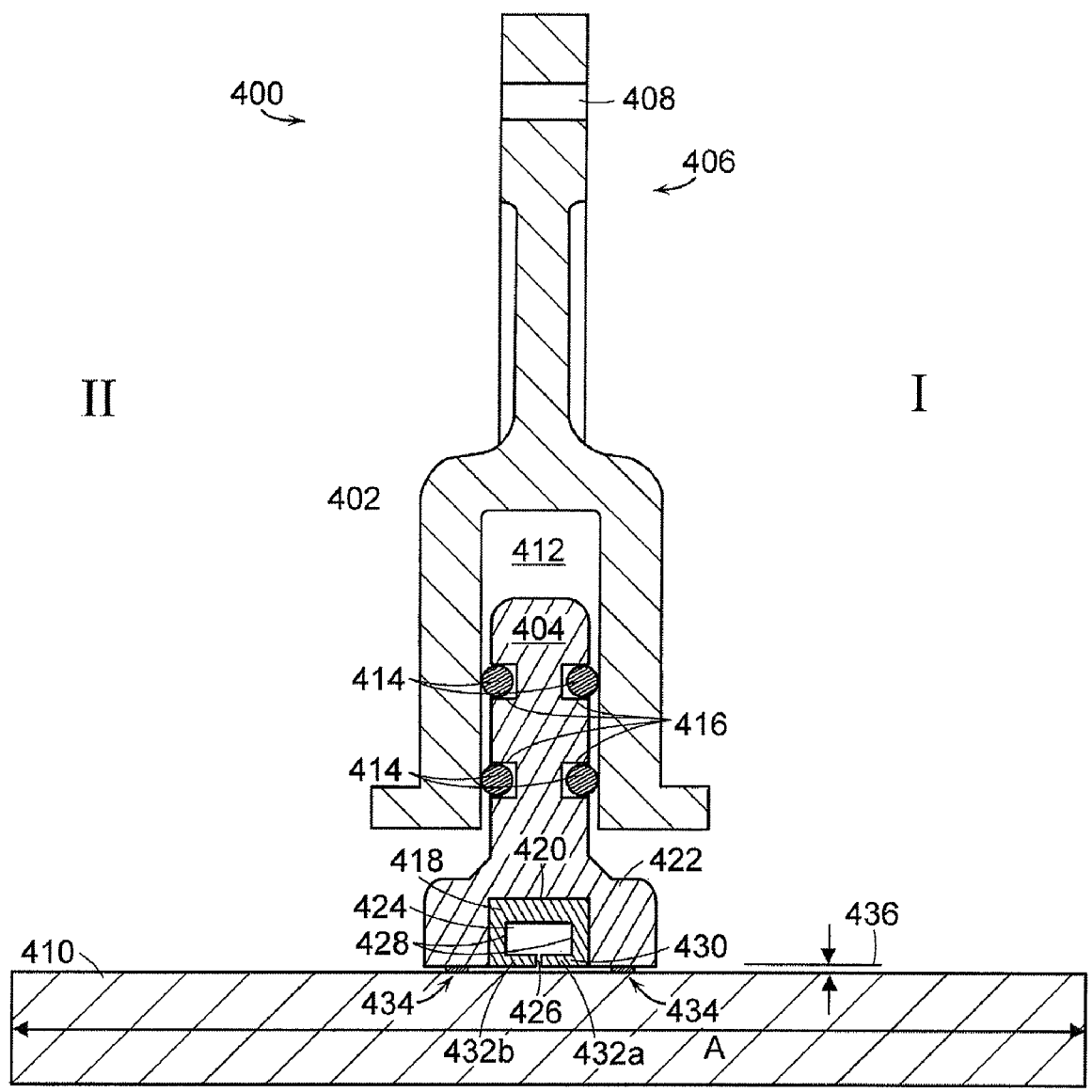
FIG. 4 is a cross-sectional view of a system, according to an illustrative embodiment of the invention.

FIG. 4 is a cross-sectional view of a system 400 that embodies the invention. The system 400 includes a housing 402 disposed relative to an alignment ring 404. The housing 402 is coupled to an extensive portion 406 having one or more through-holes 408 for securing the system 400 to a wall or surface (e.g., bulkhead) through which a shaft 410 passes along a longitudinal axis A. The housing 402 defines an interior surface 412. The interior surface 412 can create a seal with respect to the alignment ring 404 by reacting against one or more o-rings 414 disposed with respect to the alignment ring 404. Annular grooves 416 within the alignment ring 404 accommodate the o-rings 414.

The system 400 includes a seal 418 disposed relative to a cavity 420 in a portion 422 of the alignment ring 404 configured to be disposed adjacent the shaft 410. The seal 418 defines a pocket 424 and an opening 426 to permit a fluid to interact with a gel material (not shown) disposed in the pocket 424. In some embodiments, the seal 418 is referred to as a "back-to-back" seal because when the gel material expands in the presence of a fluid, the gel material reacts against opposing faces 428 of the pocket 424 to force the bottom portion 430 (e.g., two oppositely-oriented axial lips 432a and 432b) of the seal 418 radially toward the shaft 410. The system 400 also includes two rings 434 disposed between the shaft 410 and the system 400. In general, each of the rings 434 is similar to the ring 122 discussed above with respect to FIG. 1.

In some embodiments, the seal 418 is positioned or secured with respect to the alignment ring 404 (e.g., the cavity 420), for example, by a friction fit. In some embodiments, the seal 418 is coupled to the alignment ring 404, for example, by bonding the seal 418 to the envelope 420 or by forming the seal 418 from the same material as the alignment ring 404. As fluid from a first compartment I migrates through a gap 436 or radial distance between the alignment ring 404 and the shaft 410 toward the second compartment II, the fluid enters the opening 426 of the seal 418. Fluid entering the opening 426 interacts with, contacts, or wets the gel material disposed inside the pocket 424. The gel material expands and forces the lips 432a and 432b into contact with the shaft 410 to create a fluid-tight seal with respect to the shaft 410. Expansion of the gel material within the pocket forces the seal 418 to engage the shaft 410. The system 400 resists premature wear on the seal 418 associated with frictional forces because the seal 418 does not contact or minimally contacts the shaft 410 in the absence of a fluid. In general, the gel material can include one or more of the features described regarding the embodiments discussed herein.

Figure 5:
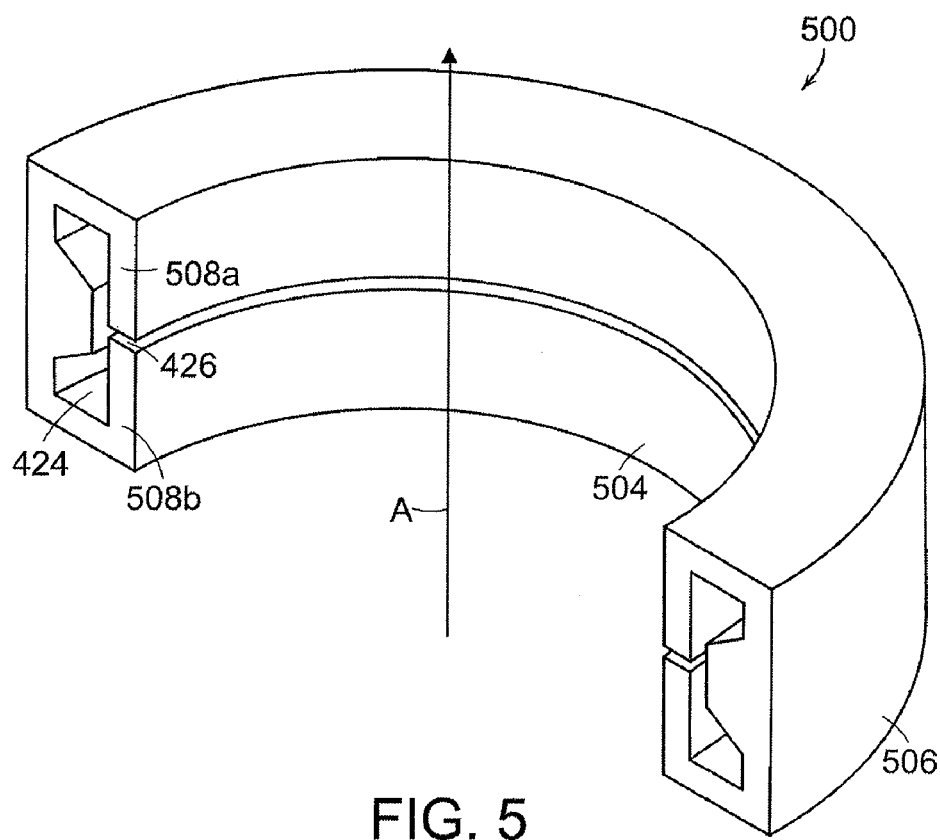
FIG. 5 is a cross-sectional perspective view of a back-to-back lip seal for use in the system of FIG. 4.

FIG. 5 is a cross-sectional perspective view of a back-to-back lip seal 500 for use in the system of FIG. 4 (as, for example, the seal 418 of FIG. 418). In some embodiments, the seal 500 is formed of an elastomer or a rubber material. In some embodiments, the seal 500 is a unitary structure and forms a substantially continuous ring for disposing about the shaft (not shown) defining the longitudinal axis A. In some embodiments, the seal 500 may be formed of one or more components that cooperate to form a substantially continuous ring.

The seal 500 includes a first portion 504 for disposing adjacent the shaft and a second surface 506 for reacting against an external component (e.g., the alignment ring 404, the housing 402, or both of these components of FIG. 4). The first portion 504 includes two oppositely-facing lips 508a and 508b with an opening 426 disposed between the lips 508a and 508b. The opening 426 permits a fluid that flows along the first portion 504 to contact or wet a gel material (not shown) disposed within a pocket 424 of the seal 500. The gel material expands in the presence of a fluid and reacts against an interior of the pocket 424. As the gel material expands, one or both of the lips 508a and 508b are deformed and moved toward the shaft to establish contact with the shaft to create a fluid-sealing interface. Contact between the lips 508a and 508b and the shaft reduces a flow of the fluid between the shaft and the seal 500. The gel material continues to provide expansion forces to reinforce or strengthen the seal 500 with respect to the shaft as the pressure differential increases between compartments of a structure (e.g., between compartment I and compartment II of FIG. 4).

In some embodiments, the seal 500 is formed of a material sufficiently rigid to prevent the first portion 504 or the lips 508a and 508b from engaging the shaft in the absence of a fluid. The seal 500 is formed of a material sufficiently pliable to permit deformation of the lips 508a and 508b by expansion of the gel material in the presence of a fluid to move the lips 508a and 508b towards the shaft. Because the second surface 506 reacts against the relatively fixed external component, the expansion is substantially toward the shaft. Although the seals 300 and 500 of FIGS. 3 and 5 respectively are illustrated as semi-circles, seals having other geometries (e.g., rectilinear geometries or other curvilinear geometries or combinations thereof) are within the scope of invention.

Figure 6:
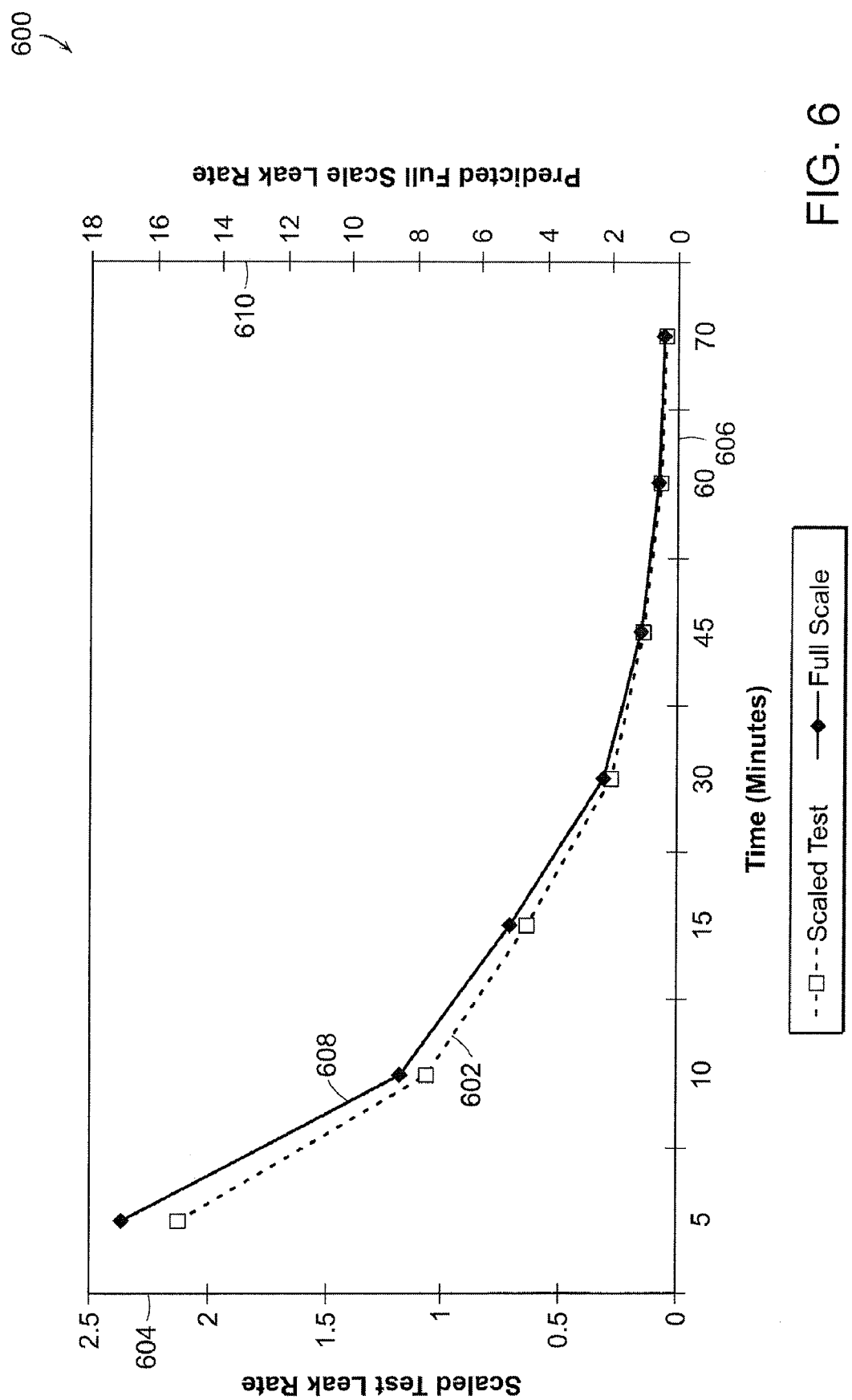
FIG. 6 is a graphical representation of leak rate data for a system that embodies the invention.

FIG. 6 is a graphical representation of leak rate data for a system that embodies the invention. The data was obtained from observation of the performance of a prototype system. The prototype system was designed as an approximately $\frac{1}{8}^{th}$-scale model of a system that could be used on a propeller shaft of a DDG-type destroyer. The system incorporated the elements of FIG. 1. For example, the diameter of the prototype shaft was about 63.5 mm. The diameter of the full-scale shaft on a DDG-type destroyer propeller is about 508 mm. The maximum revolutions per minute (RPM) for the full-scale shaft permitted by shipbuilder regulations is about 168 RPM. The $\frac{1}{8}^{th}$-scale prototype was tested at about 1,344 RPM to account for the difference in shaft diameter. The test setup included a first compartment in an ambient pressure environment and a second compartment in a pressurized environment (e.g., in the presence of water). The pressure drop between the first compartment and the second compartment caused the water to seek to migrate towards the lower-pressure first compartment. The leak rate of water entering the first compartment was measured during the experiment.

The graph 600 includes a first curve 602 of the leak rate obtained with the prototype system. The first curve 602 corresponds to the leak rate values in U.S. pints/hour of the vertical axis 604 against time (minutes) on the horizontal axis 606. The graph 600 also includes a second curve 608 mapping the leak rate in U.S. pints/hour of the vertical axis 610 against time (minutes) on the horizontal axis 606. The curve 608 represents the predicted performance of a system designed for use in the full-scale system for the DDG-type destroyer illustrating expected data based on the first plot 602. The data represented by the second curve 608 is a linear extrapolation of the data represented by the first curve 602 (scaled by a factor of 8 to compensate for the $\frac{1}{8}^{th}$-scale of the prototype).

The data associated with plot 602 reflects a seal (e.g., the seals 120a and 120b) having hardness of about Shore durometer of A60. Seals of other hardness were also successfully tested. Seals having hardness in a range from about a Shore durometer of A20 to about a Shore durometer of A60 also have been used. In some embodiments, the hardness value chosen for a particular seal depends on usage parameters associated with the seal, for example, the amount of time that the seal will be active. During testing, the gel material disposed within the seal (e.g., within a pocket of the seal) responded to the presence of a fluid, in this case water, within a few seconds of exposure to the fluid. The first curve 602 illustrates that the leak rate from the first compartment I to the second compartment II decreases to about 1.5 U.S. pints/hour (about 0.197 ml/s) after about 10 minutes. Further, the leak rate is less than 0.1 U.S. pints/hour (about 0.0131 ml/s) after about one hour.

The second curve 608 illustrates that the leak rate is expected to be about 9 U.S. pints/hour (about 1.183 ml/s) after about 10 minutes and less than about 0.5 U.S. pints/hour (about 0.065 ml/s) after one hour. Additionally, the leak rate observed under exemplary pressure differentials of about 7.5 psid (pounds per square inch difference) (about 5,273 kg/m$^2$) and 15.0 psid (about 10,550 kg/m$^2$) was lower than that of the first curve 602 or the second curve 608 because increases in differential pressure increase the sealing ability of the seal. In some embodiments, marginally higher leak rates were obtained when the $\frac{1}{8}^{th}$-scale shaft was spinning at about 720 and 1440 RPM (corresponding to about 90 and 180 RPM for the full-scale shaft).

Figure 7:
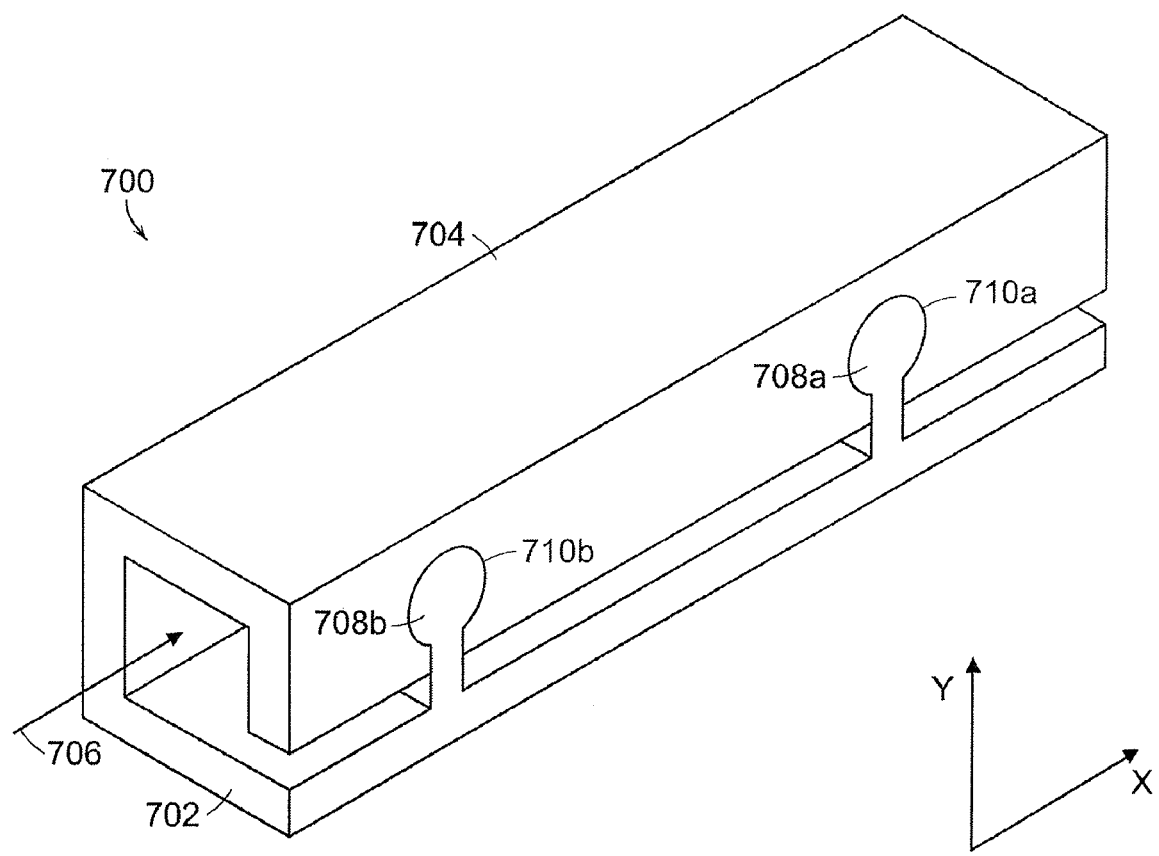
FIG. 7 is a cross-sectional perspective view of a seal according to an illustrative embodiment of the invention.

FIG. 7 is a cross-sectional perspective view of a seal 700 that embodies the invention. The seal 700 includes a lip portion 702 and an upper portion 704. A pocket 706 is defined by the lip portion 702 and the upper portion 704. In some embodiments, a gel material (not shown) is disposed within the pocket 706. The seal 700 includes two connector portions 708a and 708b (generally 708) that extend from the lip portion 702 toward the upper portion 704 along the Y-axis. The upper portion 704 defines corresponding surfaces 710a and 710b (generally 710) configured for mating with the connector portions 708a and 708b. In some embodiments, the seal 700 is made from an elastomer material or a rubber material (e.g., natural or synthetic rubber).

In some embodiments, the connector portions 708a and 708b prevent the lip portion 702 from moving away from the upper portion 704 (e.g., along the Y-axis) under, for example, the influence of gravity or from the weight of the gel material on the lip portion 702. In the presence of a fluid, the gel material within the pocket 708 expands and urges the lip portion 702 away from the upper portion 704. The connector portions 708a and 708b react against the corresponding surfaces 710a and 710b of the upper portion 704 to resist movement of the lip portion 702. The gel material provides an expansion force sufficient to overcome this resistance and dislodge the connector portions 708a and 708b from the corresponding surfaces 710a and 710b. After the connector portions 708a and 708b have been dislodged, the gel material can move the lip portion 702 away from the upper portion 704. Alternative geometries, quantities, and configurations of the connector portions 708 and the corresponding surfaces 710 are contemplated in alternative embodiments of the invention.

FIG. 8A is a cross-sectional view of a portion of a system 800, according to an illustrative embodiment of the invention. The system 800 includes a support component 804 and a carrier component 808. The system 800 also includes a sealing system 812. The sealing system 812 includes a first lip seal 814a that includes a first lip portion 816a and a second lip seal 814b that includes a second lip portion 816b as well as a first gel material 820a and a second gel material 820b (generally 820). The gel material 820a and 820b can be embedded in a hard open cell foam or a soft open cell foam. As illustrated, the gel material 820 is embedded in an open cell foam. The open-cell foam is a fluid-permeable material that partially absorbs fluid and permits the fluid to interact with the gel material 820a-820b, resulting in expansion of the gel material 820a-820b. The sealing system 812 behaves similarly to the seals 120a-120b in response to exposure to a fluid.

A first retaining component 824a couples the first lip seal 814a and the first gel material 820a to the carrier component 808. A second retaining component 824b couples the second lip seal 814b and the second gel material 820b to the carrier component 808. The first retaining component 824a and the second retaining component 824b couple the lip seals 814a-814b (generally 814) and the gel material 820 to the carrier component 808. The lip seals 814 and the gel material 820 can be coupled to the carrier component through an interference fit (e.g., a diametral interference fit), a mechanical fit (e.g., using mechanical fasteners, such as screws or bolts to fasten the retaining components 824a-824b (generally 824) to the carrier component 808), an adhesive fit (e.g., by bonding), or combinations of these fitting techniques. Other techniques for coupling the lip seals 814 and gel material 820 to the carrier component 808 can be used.

The carrier component 808 defines an exterior surface 828 and an interior surface 832. The interior surface 832 defines a channel 836 or open space. The carrier component 808 also defines two grooves 840a-840b. O-rings 844a-844b (generally 844) are disposed within the grooves 840a-840b to create a seal between the interior surface 832 of the carrier component 808 and an exterior surface 848 defined by the support component 804. The o-rings 844a-844b reduce the size of a potential path from compartment I to compartment II (and vice versa) for fluid to flow (e.g., between the exterior surface 848 of the support component 804 and the interior surface 832 of the carrier component 808 and/or via the channel 836). In some embodiments, the support component 804, the carrier component 808, the sealing system 812 (e.g., the lip seals 814), the retaining component 824, the o-rings 844, or a combination of these elements are made from material having low water or fluid absorption. Low-absorption materials can be used, for example, to reduce or prevent swelling of components of the system 800, other than the gel material 820, which can absorb fluid and expand. In some embodiments, swelling can result in binding of components of the system 800 against the shaft 852, which can lead to friction and/or failure of the system 800. An example of a low-water-absorption material is a Garolite G-10/FR4 material, sold by, for example, Professional Plastics, of Fullerton, Calif. Other phenolic plastic materials can also be used.

The system 800 also includes a shaft 852. During normal operating conditions, the shaft 852 is positioned in a spaced relationship from a surface 856 defined by an extensive portion 860 of the carrier component 808. In some embodiments, an alignment ring, for example, the alignment ring 116 of FIG. 1, is positioned between the shaft 852 and the surface 856 (e.g., bonded or attached to the surface 856 in a spaced relationship with the shaft 852). The alignment ring can be made of a low-friction or a low-wear material. In some embodiments, the alignment ring includes a Teflon® material. The shaft 852 is also in a spaced relationship from the lip seals 814 (e.g., and the lip portions 816a-816b (generally 816)). The spaced relationship between the shaft 852 and the surface 856 and the lip seals 814 defines a gap 864. During normal operation, the gap 864 permits the shaft 852 to rotate without being in contact with the lip seals 814 or the surface 856, which reduces friction between the shaft 852 and the lip seals 814 and/or the surface 856. The gap 864 is a potential fluid path between compartment I to compartment II.

The shaft 852 can move along a direction parallel to the x-axis or along a direction parallel to the y-axis, or some combination of both directions. The shaft 852 can come into contact with the surface 856 in response to movement of the shaft 852 along the y-axis. When the shaft 852 contacts the surface 856 of the carrier component 808, the carrier component can also move in a direction parallel to the y-axis. The interior surface 832 of the carrier component 808 slideably engages the exterior surface 848 of the support component 804 in response to corresponding movement by the shaft 852. As a result, the carrier component 808 can move in response to movement by the shaft 852 independently of whether the lip seals 814 (or the lip portions 816) engage or are in contact with the shaft 852. The distance along the y-axis between the channel 836 and the support component 804 is related to the amount of movement the shaft 852 of the system 800 can withstand without damaging or affecting the operation of components of the system 800 (e.g., the support component 804, carrier component 808, or sealing system 812).

The o-rings 844a-844b disposed in the grooves 840a-840b in the interior surface 832 provide a fluid-tight seal between the support component 808 and the carrier component 808 while also facilitating slideable movement of the carrier component 808 relative to the support component 804 (e.g., along the y-axis) in response to movement of the shaft 852 along the y-axis.

When the gel material 820a in the sealing system 812 is exposed to a fluid, the gel material 820a expands, urging the lip portion 816a of the lip seal 814a towards or into contact with the shaft 852. When the lip portion 816a is urged toward or into contact with the shaft 852, the size of the gap 864 (e.g., measured along the y-axis or measured as the area between the shaft 852 and the system 800) is reduced. In this embodiment, fluid interacts with the gel material 820a by passing through a gap 866 between the lip seal 814a and/or lip portion 816a and the retaining component 824a.

In some embodiments, the lip portion 816a does not contact the shaft 852 when the gel material 820a is exposed to a fluid, but the size of the gap 864 is reduced by movement of the lip portion 816a towards the shaft 852. In some embodiments, the lip portion 816a is urged into nominal contact with the shaft 852. Nominal contact involves the lip portion 816a physically contacting the shaft, but the lip portion 816a does not exert substantial pressure on the shaft 852. Nominal contact does not involve a substantial amount of friction between the shaft 852 and the lip portion 816a. In some embodiments, nominal contact refers to the situation in which the normal component of the force on the lip portion 816a by the shaft 852 is not substantial. In some embodiments, nominal contact produces a Venturi effect to restrict or control the flow of the fluid through the gap 864.

In some embodiments, the lip portion 816a is urged into engagement with the shaft 852. Engagement with the shaft 852 involves physical contact between the shaft 852 and the lip portion 816a, with pressure exerted therebetween. Additionally, when the lip portion 816a is engaged with the shaft 852, friction develops between the lip portion 816a and the shaft 852 (e.g., the normal component of the frictional force between the lip portion 816a and the shaft 852 is greater than during nominal contact). Some implementations feature a debris (e.g., dirt or dust) guard (not shown) disposed about the system 800 to reduce an amount of debris that would otherwise enter between the system 800 and the shaft 852. An example of a debris guard is a rubber dust boot, which is mounted to the support component 804, carrier component 808, or the bulkhead structure B. The debris guard reduces or eliminates debris entering the gap 864 from compartment I and/or compartment II. In some embodiments, the debris guard includes a sealing structure that acts as either a primary seal or as a backup seal for the sealing structure 812. This is described, for example, in more detail below with respect to FIGS. 12A-12C.

Expansion of the gel material 820a is a reversible effect. For example, the gel material 820a expands when the gel material 820a is exposed to a fluid. The gel material 820a contracts in the absence of the fluid (e.g., as the gel material 820a or the open cell foam material dries). Contraction of the gel material 820a allows or causes the lip portion 816a to return to an original shape and/or increases the size of the gap 864. When the lip portion 816a is in nominal contact with the shaft, contraction of the gel material 820a can form the gap 864 by allowing the lip portion 816a to move out of nominal contact with the shaft 852 (thus, forming the gap 864). When the lip portion 816a is in engagement with the shaft 852, contraction of the gel material 820a can result in nominal contact of the lip portion 816a with the shaft 852 or can result in the lip portion 816a moving out of contact with the shaft 852 (thus, forming the gap 864).

In some embodiments, the reversible effect associated with the gel material 820a involves temperature-dependence of the gel material 820a. For example, expansion and/or contraction of the gel material 820a can depend on the phase transition temperature of the particular type of gel material selected. The gel material 820a can expand in response to the temperature of the gel material 820a falling below the phase transition temperature of the particular type of gel material selected (the gel material 820a then contracts in response to the temperature of the gel material 820a exceeding the phase transition temperature). Moreover, in other embodiments, the gel material 820a can contract in response to the temperature of the gel material 820a exceeding the phase transition temperature of the particular type of gel material selected (the gel material 820a then contracts in response to the temperature of the gel material 820a falling below the phase transition temperature).

The reversible effect can be associated with stimuli other than or in addition to temperature. Examples of such stimuli include any of the following, either alone or in combination: pH of the fluid (measured using, e.g., total scale, free scale, or seawater scale units), salinity of the fluid, concentration or purity of the fluid, chemical composition of the fluid, density, or viscosity of the fluid (e.g., kinematic or dynamic viscosity). In some embodiments, the responsiveness of the gel material 820 to external stimuli can be selected to prescribe how the gel material 820 will expand or contract based on operating conditions to which the system 800 is exposed. For example, the responsiveness of the gel material 820 (e.g., the speed and/or quantity of volumetric expansion or contraction) can affect the ability of the sealing system 812 to prevent or reduce the flow of a fluid from compartment I to compartment II, and vice versa.

In some embodiments, the support component 804 is an annular body that can be mounted or secured to a bulkhead structure B. In some embodiments, the support component 804 forms a part of the bulkhead structure (illustrated for example in FIG. 9C). For example, the exterior surface 848 of the bulkhead structure B can be shaped (e.g., machined or finished) to have a relatively smooth portion that facilitates slideable engagement with the interior surface 832 of the carrier component 808. Such embodiments generally involve a carrier component 808 with a larger outer radius R than embodiments in which the support component 804 is mounted or secured to the bulkhead structure.

In some embodiments, fluid in compartment II is exposed to or interacts with the first gel material 820a, causing the first gel material 820a to expand and urge the lip portion 816a towards or into contact with the shaft 852. In such embodiments, the fluid in compartment II does not necessarily cause the second gel material 820b to expand (e.g., unless the second gel material 820b is also exposed to the fluid). For example, the fluid in compartment II is isolated from the second gel material 820b by expansion of the first lip portion 816a towards or into contact with the shaft 852. In other embodiments, the fluid in compartment II can be exposed to the second gel material 820b (e.g., by splashing), thereby causing the second gel material 820b to expand urging the second lip portion 816b towards or into contact with the shaft 852. Thus, expansion of the gel material 820a reduces the size of or eliminates a flow path from the compartment II to the compartment I (e.g., via the gap 864). When fluid is also present in compartment I and the second gel material 820b is exposed to the fluid, the second gel material 820b expands, urging the lip portion 816a towards or into contact with the shaft 852. As a result, when fluid is present in both compartment I and compartment II, the lip portions 816a-816b and the gel materials 820a-820b reduce or eliminate a flow path from compartment I to compartment II and from compartment II to compartment I. Thus, the first lip portion 816a and the first gel material 820a act as a back-up seal to reduce or eliminate the size of a flow path from compartment I to compartment II if the lip portion 816b does not eliminate the flow path from compartment I to compartment II (e.g., if the lip portion 816b is not in nominal or engaged contact with the shaft 852. Similarly, the second lip portion 816b and the second gel material 820b act as a back-up seal to reduce or eliminate the size of a flow path from compartment II to compartment I if the lip portion 816a does not eliminate the flow path from compartment II to compartment I.

In some embodiments, the carrier component 808 is configured or shaped to facilitate positioning the seal 500 of FIG. 5 relative to the shaft 852, similarly to the configuration depicted in FIG. 4. For example, the region 868 of the carrier component 808 that is close to the shaft 852 can be fabricated to resemble the portion 422 of the alignment ring 404 of FIG. 4.

FIG. 8B is a partial cross-sectional perspective view of the system 800 of FIG. 8A. The support component 804 shown in FIG. 8B includes an interface region 872 that defines a plurality of through-holes 876 that correspond to holes (not shown) in a bulkhead structure (not shown). The system 800 can be mounted to the bulkhead structure by passing fasteners (e.g., carriage bolts or lag screws) through the through-holes 876 and the corresponding holes in the bulkhead structure. When the system 800 is mounted to the bulkhead structure B, the interface region 872 can physically contact the bulkhead structure B of FIG. 8A or a surface 892 thereof.

In some embodiments, the through-holes 876 are used to mount the system 800 to a housing (not shown) that is already secured to a bulkhead structure. For example, in a system that incorporates a housing similar to the housing 104 of FIG. 1, the support component 804 can be mounted to a portion of the housing structure itself rather than directly to the bulkhead structure. Such a configuration results in the system 800 being convenient for retrofitting the system 800 with existing housing structures.

The support component 804, as depicted, is a semi-circular annular structure. The support component 804 includes a coupling flange 880 that mates with a corresponding flange (not shown) of a second semi-circular support component (not shown) to encircle a shaft (not shown) and positioning the sealing system 812 about the shaft. Thus, to mount the system 800 to a bulkhead structure, the illustrated support component 804 is secured to the bulkhead structure B of FIG. 8A and is secured to a second support component via the coupling flange 880. The coupling flange 880 includes a plurality of through-holes 884 that correspond to through-holes (not shown) in the corresponding coupling flange of the second support component. Alternative configurations for support component 804 can also be used (e.g., the configuration depicted in FIGS. 9A-9C).

In general, any of the support component 804, the carrier component 808, the lip seal 814, gel material 820, the retaining component 824, or the o-rings 844 can be semi-circular or semi-annular in shape. A semi-circular or semi-annular shape allows any of the support component 804, the carrier component 808, the lip seal 814, the gel material 820, the retaining component 824, or the o-rings 844 to be mounted or installed over the shaft 852 (e.g., disposed about a circumference or perimeter of the shaft 852) in two pieces that are coupled together (e.g., mechanically with, for example, friction, bolts, screws, pegs, magnets or rivets or adhesively with, for example, a chemical adhesive or bonding agent). For example, two semi-circular or semi-annular halves (not shown) of the carrier component 808 can be positioned in circumscribing relationship to the shaft 852. The semi-circular or semi-annular halves can then be secured together to form a single or unitary carrier component 808 structure that is disposed about a circumference or perimeter of the shaft 852.

In some embodiments, the support component 804 is secured to the bulkhead structure before being secured to the second support component. In other embodiments, the support component 804 is first secured to the second support component before the assembled support components are mounted or secured to the bulkhead structure. The support component 804 is shaped such that the coupling flange 880 is positioned relative to the interface region 872. The position of the coupling flange 880 permits the support component 804 to fit within an opening (not shown) defined by the bulkhead structure.

The retaining component 824a in FIG. 8B includes a plurality of slots 888 that allow fluid to pass therethrough and interact with the gel material 820a. The sizing and positioning of the slots 888 can be manipulated or controlled to control the amount of fluid that interacts with the gel material 820a. For example, increasing the number or size of the slots 888 can reduce the amount of fluid required for the gel material 820a to expand and urge the lip portion 816a towards or into contact with the shaft (e.g., more slots 888 allow more fluid to interact with the gel material 820a). Conversely, decreasing the number or size of the slots 888 can increase the amount of fluid required for the gel material 820a to expand and urge the lip portion 816a towards or into contact with the shaft.

An advantage of the system 800 shown in FIG. 8B is that the support component 804 is relatively lightweight compared to other mechanisms for positioning the carrier component 808 or sealing system 812 relative to the shaft. The support component 804 can be made from a material such as bronze aluminum. The generally planar, annular shape of the support 804 is one reason that the support component 804 is relatively light-weight compared to other components used to position a carrier component 808 or sealing system 812 relative to the shaft. For example, the housing of FIGS. 1 and 3 require more material because the housing surrounds the alignment ring (e.g., an interior surface of the housing engages an exterior surface of the alignment ring). In contrast, in the embodiment of FIGS. 8A-8B, an interior surface 832 of the carrier component 808 engages an exterior surface 848 of the support component 804, allowing the support component 804 to be fabricated (e.g., cast) with less material.

As an additional advantage, where the support component 804 does not exceed a specified weight, the system 800 can be installed without the assistance of a rigger. In addition to being relatively lightweight, the support component 804 is relatively easy to machine or cast in metal compared to support components having other shapes. Additionally, the carrier component 808 can also be made of a relatively light-weight material such as, for example, a Garolite G-10/FR4 material. Such a material is sufficiently light-weight and rigid.

Additional advantages will be apparent. For example, the width $W_c$ of the carrier component 808 is independent of the width Ws of the support component shown in FIG. 8A. As a result, the carrier component 808 can be widened along the x-axis to facilitate inclusion of bearings, as discussed below with respect to FIGS. 11B-11C, independent of the width Ws of the support component 804.

Figure 8C:
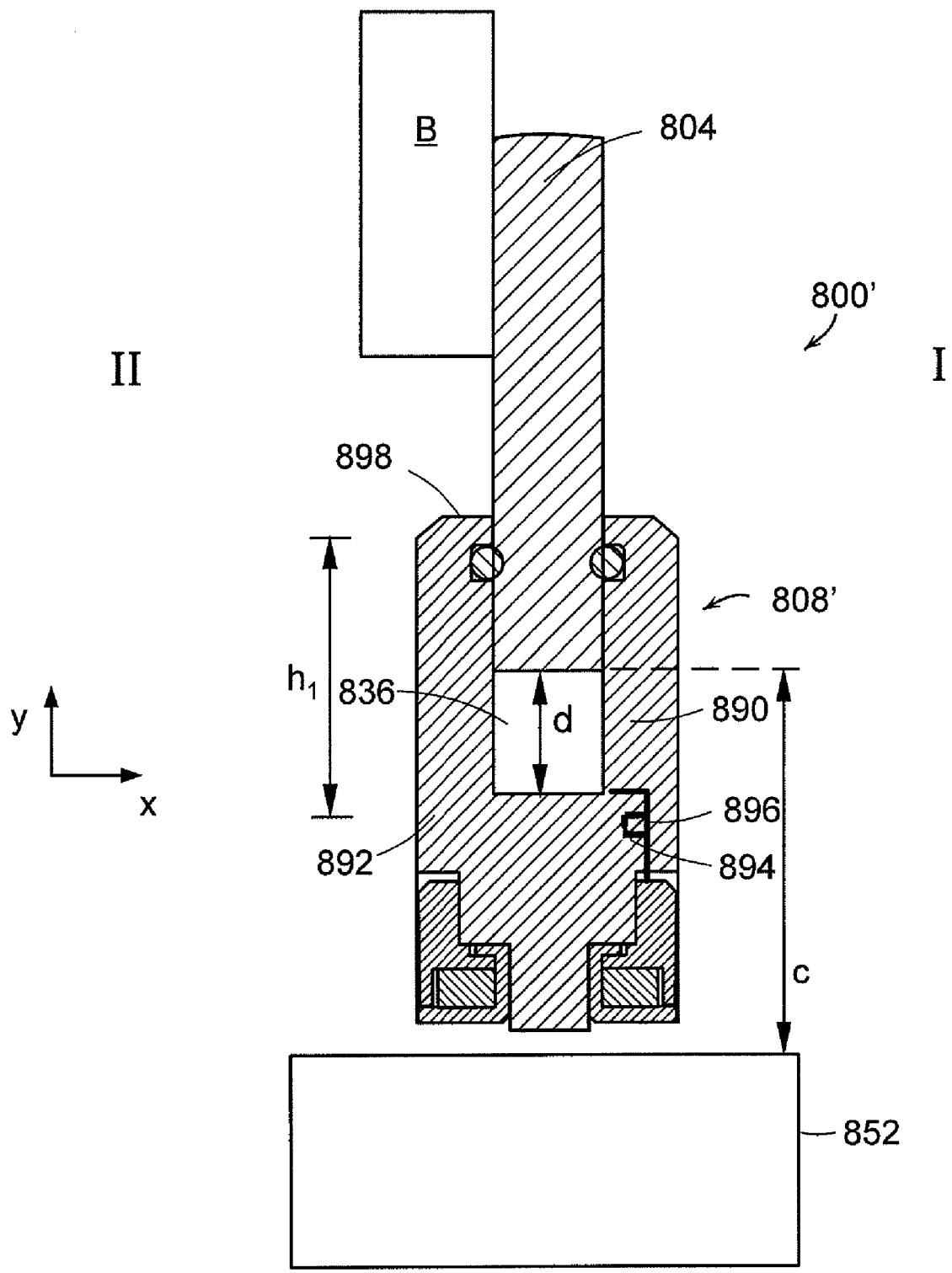
FIG. 8C is a cross-sectional view of a portion of a system that includes an alternative carrier component, according to an illustrative embodiment of the invention.

FIG. 8C is a cross-sectional view of a portion of a system 800' that includes an alternative carrier component 808'. The carrier component 808' includes a first piece 890 and a second piece 892 that is detachably mountable or securable to the first piece 890. The second piece 892 can be mounted to the first piece mechanically (e.g., using bolts, screws or an interference fit), adhesively (e.g., by bonding), or some combination of mechanically and adhesively. The second piece 892 defines a groove 894 for housing an o-ring 896. When the second piece 892 is mounted to the first piece 890, the o-ring 896 facilitates a fluid-tight seal therebetween, reducing or eliminating a flow path from the first compartment I to the second compartment II, for example, between the first piece 890 and the second piece 892 (and via the channel 836).

In some embodiments, the first piece 890 rather than the second piece 892 can define a groove (not shown) for seating the o-ring 896 to facilitate a fluid-tight seal. An advantage to the carrier component 808' of FIG. 8C includes permitting the system 800' to be installed in relatively small spaces (e.g., where the clearance C between the support component 804 and the shaft 852 along the y-axis is less than the distance h1 between the channel 836 and an outer diameter surface 898 of the support component 808'). Such a configuration allows relatively large movement along the y-axis by the shaft (e.g., the distance d between the channel 836 and the support component 804) while retaining small size of the system 800'.

Figure 9B:
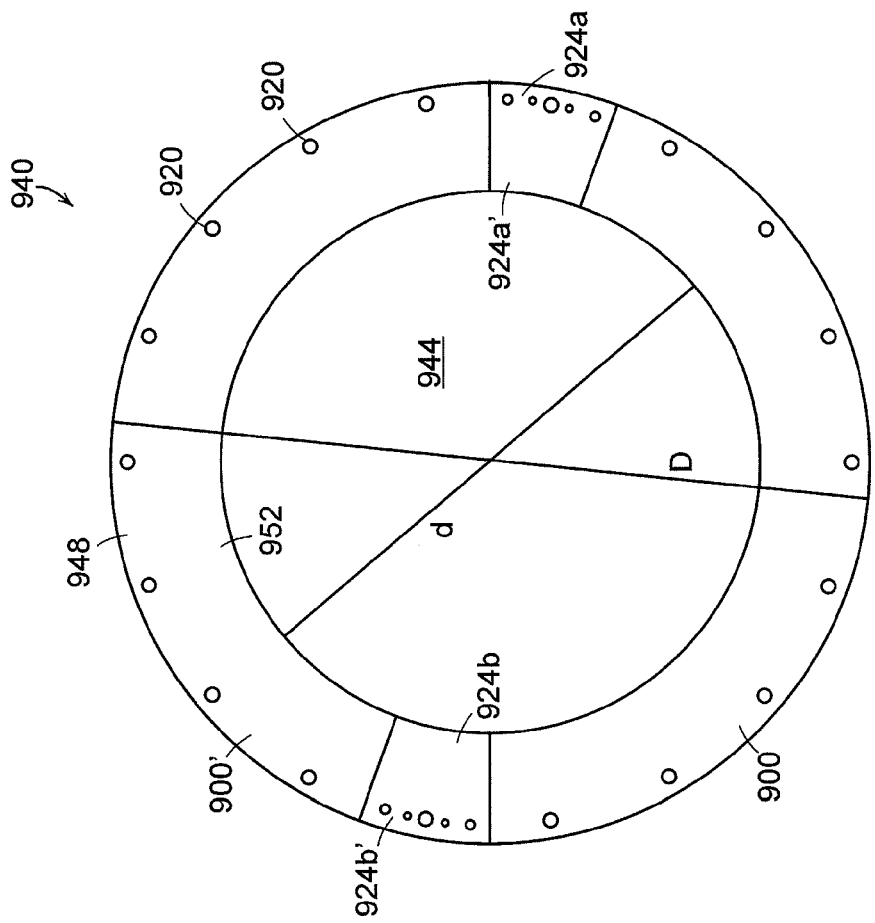
FIG. 9B is a top plan view of an assembled support structure.
Figure 9A:
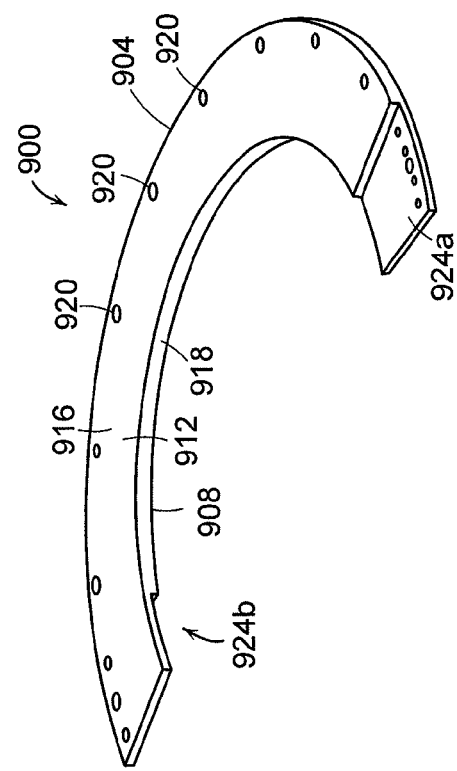
FIG. 9A is a perspective view of a portion of a support component, according to an illustrative embodiment of the invention.

FIG. 9A is a perspective view of a portion of a support component 900 according to an illustrative embodiment of the invention. The support component 900 defines a semicircular shape and defines an outer diameter surface 904 and an inner diameter surface 908. The support component 900 also defines an annular surface 912 that includes an interface portion 916. The support component 900 also includes a second annular surface 918 that is substantially parallel to and opposite-facing from the annular surface 912. The annular surface 912 and the second annular surface 918 can be disposed in an alternative arrangement (e.g., non-parallel). The interface portion 916 defines a plurality of through-holes 920 extending through the support component 900 (e.g., from the annular surface 912 to the second annular surface 918). The plurality of through-holes 920 facilitate mounting the support component 900 to a bulkhead structure (e.g., placing the interface portion 916 into physical contact with a corresponding surface (not shown) of a bulkhead structure). The support component 900 includes a first coupling region 924a and a second coupling region 924b. The coupling regions 924a-924b couple to corresponding coupling regions (not shown) of a second semi-circular support component (not shown). The coupling regions 924a-924b are an alternative to the coupling flange 880 of the support component 804 of FIG. 8B.

FIG. 9B is a top plan view of an assembled support structure 940. The support structure 940 includes the support component 900 of FIG. 9A and a symmetrical support component 900'. The first coupling region 924a of the support component 900 is secured to a corresponding coupling region 924a' of the support component 900'. Similarly, the second coupling region 924b of the support component 900 is secured to the corresponding coupling region 924b' of the support component 900'. The support structure 940 is an annular or ring-like structure that defines an opening 944 through which a shaft (e.g., a rotating shaft) can pass. The support structure 940 defines an interface surface 948 for coupling to a corresponding surface of a bulkhead structure (not shown). The interface surface 948 is disposed along an outer diameter D of the support structure 940. The support structure 940 also includes a surface 952 disposed along an inner diameter d of the support structure 940. The surface 952 facilitates slideable engagement with a corresponding interior surface (e.g., the surface 832 of FIG. 8A) of a carrier component (e.g., the carrier component 808 of FIG. 8A).

Figure 9D:
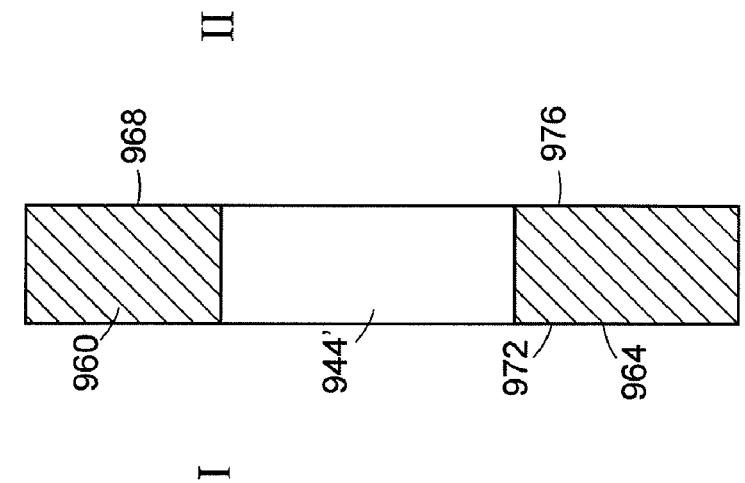
FIG. 9D is a cross-sectional view of the bulkhead structure of FIG. 9C.
Figure 9C:
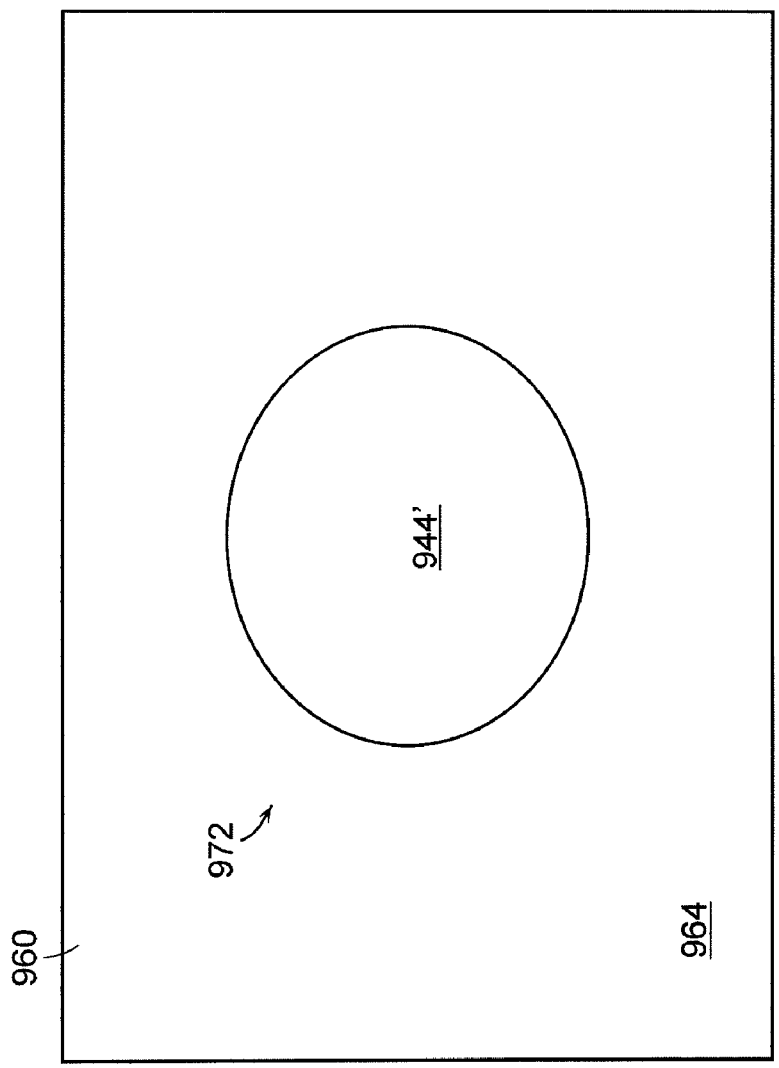
FIG. 9C is a top plan view of a bulkhead structure, according to an illustrative embodiment of the invention.

In some embodiments, the support structure 940 is formed from a portion of the bulkhead structure itself, rather than being mountable to the bulkhead structure. An example of such embodiments is illustrated in FIG. 9C, which is a plan view of a bulkhead structure 960, according to an illustrative embodiment of the invention. FIG. 9D is a cross sectional view of the bulkhead structure 960 of FIG. 9C. In the embodiments of FIGS. 9C-9D, a carrier component (e.g., the carrier component 808 of FIG. 8C) engages the bulkhead structure 960 without the need for a separate support structure (e.g., the support structure 940 of FIG. 9B) that is mountable to the bulkhead structure 960.

The bulkhead structure 960 defines a first surface 964 in compartment I and a second surface 968 in compartment II. The bulkhead structure defines an opening 944' that passes from the first surface 964 in compartment I to the second surface 968 in compartment II. The first surface 964 defines a first annular region 972 adjacent the opening 944', and the second surface 968 defines a second annular region 976 adjacent the opening 944'. The annular regions 972, 976 define a surface for slideable engagement with a corresponding interior surface of a carrier component (e.g., similar in structure and operation to the channel 832 in the carrier component 808 of FIG. 8A or the carrier component 808' of FIG. 8C). In this way, the annular regions 972, 976 are similar to the annular regions 912, 918 of FIG. 9A or the surface 952 of the support structure 940 of FIG. 9B, which facilitate slideable engagement with a carrier component.

Figure 10B:
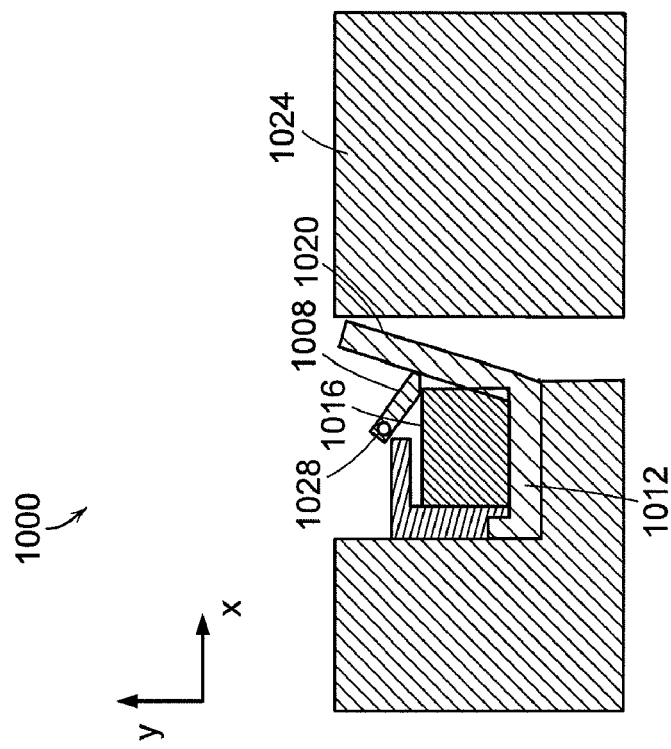
FIG. 10B is a cross-sectional view of the sealing system of FIG. 10A depicted in an activated state or in the presence of a fluid.
Figure 10A:
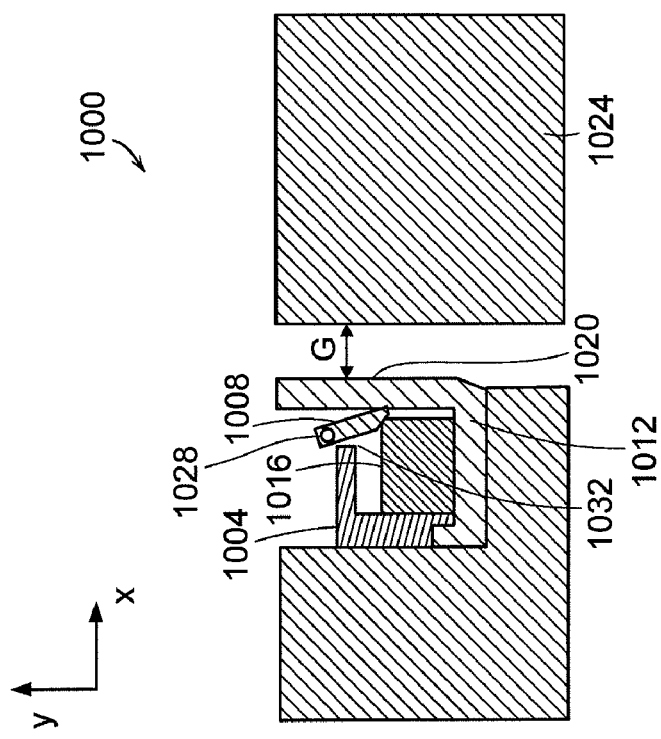
FIG. 10A is a cross-sectional view of a sealing system that includes a retaining component and a plate portion depicted in a deactivated state or in the absence of a fluid that illustrates an embodiment of the invention.

FIG. 10A is a cross-sectional view of a sealing system 1000 that includes a retaining component 1004 and a plate portion 1008 depicted in a deactivated state or in the absence of a fluid that illustrates an embodiment of the invention. The sealing system 1000 includes a lip seal 1012 and a gel material 1016. When the gel material 1016 is dry or, in the absence of a fluid, the system 1000 is in a "deactivated" state. The gel material 1016 can be disposed in a fluid-permeable hard or open cell foam (not shown). In the deactivated state, the gel and the foam material are in an original shape. Similarly, a lip portion 1020 of the lip seal 1012 is in an original, undeformed shape. FIG. 10A also depicts a shaft portion 1024. A gap G separates the lip portion 1020 of the lip seal 1012 from the shaft portion 1024.

The plate portion 1008 includes a pivot 1028 about which the plate portion 1008 rotates. The plate portion 1008 couples the gel material 1016 to the lip seal 1012. An opening 1032 is defined by the retaining component 1004 and the plate portion 1008. The opening 1032 facilitates interaction between a fluid and the gel material 1016 by allowing the fluid to enter the system 1000 to contact the gel material 1016. Exposure to the fluid causes the gel material 1016 to expand.

FIG. 10B is a cross-sectional view of the sealing system 1000 of FIG. 10A depicted in an activated state or in the presence of a fluid. As the gel material 1016 expands, the gel material 1016 reacts against the plate portion 1008 and urges the plate portion 1008 to move about the pivot 1028. As the plate portion 1008 rotates about the pivot 1028, the plate portion 1008 reacts against the lip portion 1020 of the lip seal 1012, and urges the lip portion 1020 towards or into contact with the shaft portion 1024. In some embodiments, movement of the lip portion 1020 eliminates the gap G of FIG. 10A. The lip portion 1020 can also reduce the size of the gap G (e.g., the distance along the x-axis between the shaft portion 1024 and the lip portion 1020) in response to expansion by the gel material 1016.

The plate portion 1008 amplifies the effect of expansion of the gel material 1016. For example, in a sealing system that does not include the plate portion 1008, expansion of the gel material 1016 by a fixed amount moves the lip portion 1020 proportionally to the amount of expansion of the gel material 1016. In the sealing system 1000 of FIG. 10A-10B, the lip portion 1020 moves a greater distance in response to the same amount of expansion of the gel material 1016. For example, expansion of the gel material 1016 against the plate portion 1008 urges the plate portion 1008, which acts as a lever relative to the lip portion 1020, thus increasing the distance the lip portion 1020 moves in response to expansion of the gel material 1016.

An advantage of the system 1000 of FIGS. 10A-10B is that the sealing system 1000 can be moved further away from the shaft portion 1024 (e.g., defining a larger gap G than a system without the plate portion 1008), while still adequately reducing the size or eliminating the gap G when the gel material is exposed to a fluid. A larger size of the gap G reduces wear on the lip portion 1020 of the lip seal 1012, since a larger movement of the shaft portion 1024 along the x-axis is required before the shaft portion 1024 contacts the lip portion 1020. A reduction in incidental contact between the shaft portion 1024 and the lip portion 1020 reduces wear on the lip portion.

Figure 11C:
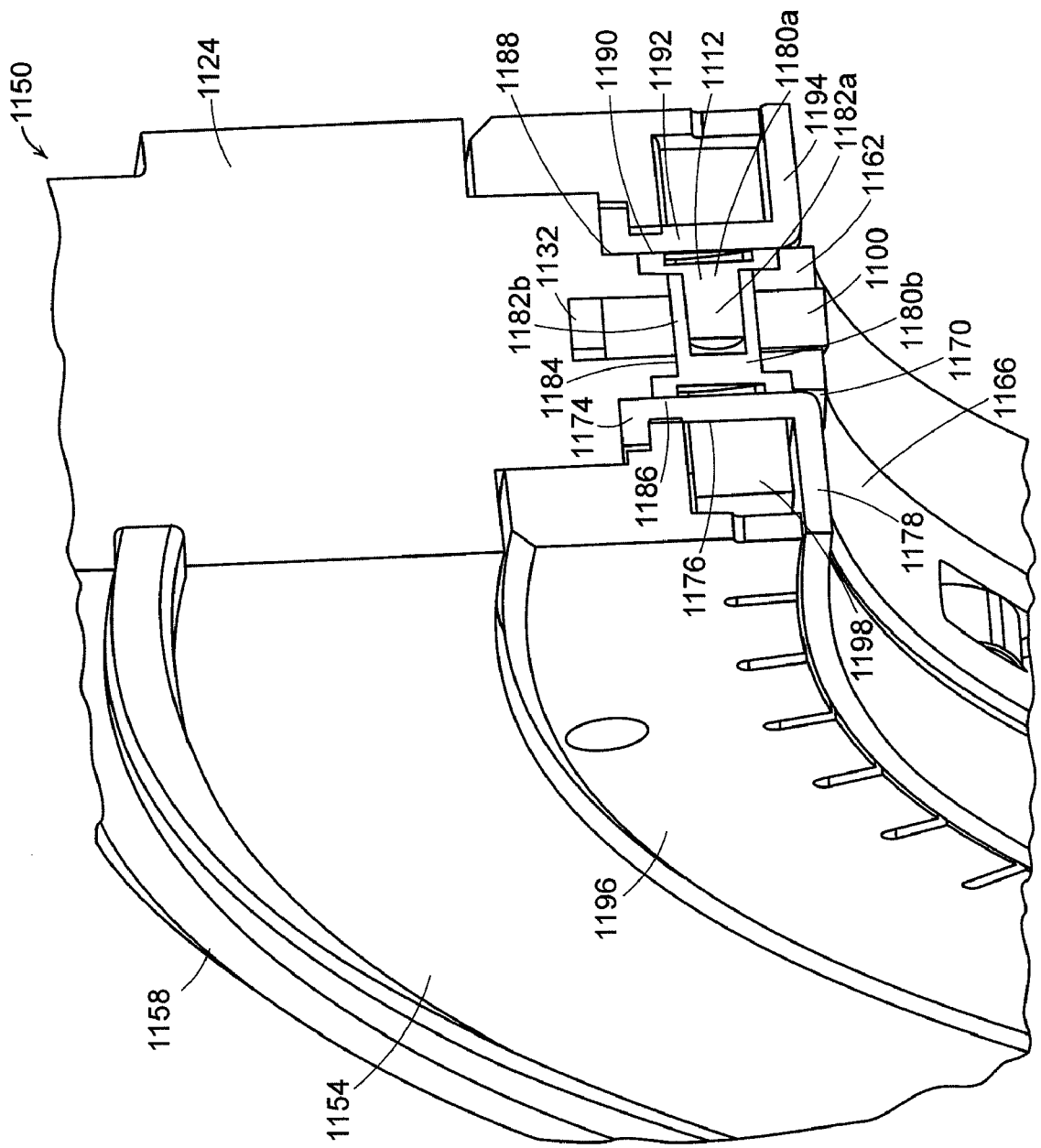
FIG. 11C is a partial cross-sectional perspective view of a sealing system including a bearing installed in a carrier component that illustrates an embodiment of the invention.

FIG. 11A is a perspective view of a bearing 1100, according to an illustrative embodiment of the invention. The bearing 1100 defines an outer diameter surface 1104 and a circular surface 1108. A bushing 1112 passes through the bearing 1100 and extends outward from the circular surface 1108 along the axis A. The bearing 1100 is generally circularly symmetric and rotatable about the axis A extending through the center of the circular surface 1108. The bearing 1100 can rotate about the axis A in response to contact with a shaft (not shown). In some embodiments, the bearing 1100 rotates about the bushing 1112, which remains stationary in response to contact by the shaft with the outer diameter surface 1104 of the bearing 1100. The bushing 1112 transfers an amount of force or load from the bearing 1100 to other bearings (not shown) to reduce friction on the bearing 1100 in response to rotation of the bearing 1100 or contact from the shaft. The bearing 1100 is also symmetric about the plane P, which is perpendicular to the axis A. The bushing 1112 defines a bushing surface 1116. When the bearing 1100 is installed in a sealing system, the bushing surface 1116 is preferably co-planar with a surface (not shown) of a carrier component (not shown). This is illustrated below with respect to FIGS. 11B-11C.

In some embodiments, a coating (not shown) is disposed on the outer diameter surface 1104 of the bearing 1100. The coating can be made from or include a low-wear material, a low-friction material, or a low-corrosion material. In some embodiments, the coating is made from or includes a low-friction, low-wear, and low-corrosion material. In some embodiments, the coating material is selected based on its resistance to friction, wear, corrosion, or some combination of these.

FIG. 11B is a partial cross-sectional perspective view of a system 1120 including a carrier component 1124 having a plurality of the bearings 1100 of FIG. 11A installed therein. The carrier component 1124 includes an inner diameter portion 1128 defining a plurality of recesses 1132. The inner diameter portion 1128 also defines a shaft-facing surface 1136. The shaft-facing surface 1136 is similar to the surface 856 of the carrier component 808 of FIG. 8A. The recesses 1132 in the inner diameter portion 1128 house the plurality of bearings 1100. Each of the plurality of bearings 1100 includes an axis A about which each bearing 1100 can rotate in response to contact with a shaft (not shown). The recesses 1132 in the carrier component 1124 are sized to allow the plurality of bearings 1100 to rotate. In this embodiment, the recesses 1132 are rectangular in shape, but other geometries are also possible.

When the plurality of bearings 1100 are installed, the bearings 1100 extend past the shaft-facing surface 1136 of the carrier component 1124 toward the center C of the system 1120. As a result, in response to movement by the shaft towards the carrier component 1124, the shaft first contacts one or more of the bearings 1100 before contacting the carrier component 1124. The bearings that are in contact with the shaft rotate, transfer or distribute load to other bearings in the system 1120, and/or absorb shock from the impact of the shaft, thus reducing friction on the carrier component 1124 and a lip seal 1140. The bearings 1100 can center and/or position the system 1120 relative to the shaft (e.g., via contact with the shaft). For example, the bearings 1100 can align or position the lip seal 1140 a generally uniform distance about a circumference of the shaft. In some embodiments, the bearings 1100 are in contact with the shaft upon installation of the system 1120 and remain in contact with the shaft during operation or rotation of the shaft.

An advantage to the system 1120 of FIG. 11B is that bearings 1100 reduce friction between the system 1120 and the shaft. Specifically, the coefficient of friction observed using a plurality of bearings 1100 is less than the coefficient of friction observed using a circumscribing component (e.g., the circumscribing component 122 of FIG. 1). For example, a circumscribing component composed of a polyfluorotetraethylene ("PTFE") material forming a hollow ring filled with bronze exhibited a dynamic coefficient of friction of between about 0.12-0.16 kg/cm$^2$. A prototype system embodying the elements of the system 1120 of FIG. 11B exhibited a dynamic coefficient of friction of approximately 0.0015 kg/cm$^2$. The dynamic coefficient of friction of the system 1120 can be reduced even further by coating the bearings 1100 with a low-friction material.

In some embodiments, reduced friction results from the fact that there is only periodic contact between the bearings 1100 and the shaft during operation (e.g., where the bearings are spaced from the shaft unless the shaft moves towards the carrier component 1124). In embodiments in which the bearings 1100 transfer a load imposed by the shaft, reduced friction on individual bearings results from the transferred load being distributed to other bearings. In embodiments where the bearings are in substantially constant contact with the shaft, reduced friction results because the only contact points between the shaft and the system 1120 occur via the bearings, in contrast to a component (not shown) that circumscribes a perimeter of the shaft and, which therefore would be in constant contact with the shaft about the circumference of the shaft.

Such a circumscribing component (e.g., the alignment ring 122 of FIG. 1) may, however, be advantageous for other reasons (e.g., cost, ease of manufacture or installation, weight, or other factors). Moreover, friction resulting from a circumscribing component can be reduced in other ways (e.g., by selecting a material exhibiting low-wear, low-friction, low-corrosion, or some combination of these properties). As a result, either a circumscribing component or a carrier component 1124 configured to house a plurality of bearings 1100 can be used, depending on the particular sealing application.

The carrier component 1124 includes a first carrier piece 1124a and a second carrier piece 1124b. The first carrier piece 1124a includes through-holes 1144a, 1148a, and the second carrier piece 1124b includes through-holes 1144b, 1148b. The first carrier piece includes connection portion 1144b' and connection portion 1148b'. The second carrier piece includes connection portion 1144a' and connection portion 1148a'. The connection portions 1144a', 1144b', 1148a', and 1148b' can be threaded. To install the carrier component 1124 about a shaft that passes through center C of the system 1120, fasteners are passed through the through-holes 1144a, 1144b, 1148a, and 1148b and connected to connection portions 1144a', 1144b', 1148a', and 1148b' to secure the first carrier piece 1124a to the second carrier piece 1124b. As illustrated in FIG. 11B, the carrier component 1124 does not depict an interior surface defining a channel (e.g., similar to the interior surface 832 defining channel 836 in FIG. 8A); however, it will be appreciated that the carrier component 1124 of FIG. 11B can include an interior surface and a channel for slideable engagement with a corresponding surface of a support component or a bulkhead structure.

FIG. 11C is a partial cross-sectional perspective view of a sealing system 1150 including a bearing 1100 installed in a carrier component 1124 that illustrates an embodiment of the invention. The carrier component 1124 defines an annular body 1154. The annular body 1154 can define a channel (not shown) along an outer circumference 1158. The channel is formed in the annular body 1154 (similar to the channel 836 illustrated in FIG. 8A). Alternatively, the annular body 1154 can be used within a housing (e.g., the housing 104 of FIG. 1). In such embodiments, the annular body 1154 need not define a channel. The annular body 1154 defines an extensive portion 1162 along an inner surface 1166 of the annular body 1154.

The extensive portion 1162 of the annular body 1154 includes a recessed region 1132. The recessed region 1132 houses the bearing 1100 and facilitates rotation of the bearing 1100. The extensive portion 1162 also defines an exterior surface 1170 that is part of the annular body 1154. The system 1150 includes a lip seal 1174 that includes a vertical component 1176 and a lip portion 1178. The vertical component 1176 of the lip seal 1174 is positioned along the exterior surface 1170 of the extensive portion 1162 when the lip seal 1174 is installed in the system 1150.

The bearing 1100 is secured to the carrier component 1124 with a bushing 1112. More specifically, the bearing 1100 is secured in a recessed region 1132 of the extensive portion 1162 of the annular body 1154. The bushing 1112 includes a first bushing piece 1180a and a second bushing piece 1180b. In some embodiments, a male portion 1182a of the first bushing piece 1180a threadably engages a female portion 1182b of the second bushing piece 1180b to secure the first bushing piece 1180a to the second bushing piece 1180b. The bushing 1112 positions the bearing 1100 relative to the recessed region 1132 of the annular body 1154. The second bushing piece 1180b defines an outer circumference 1184 about which the bearing 1100 rotates in response to contact with a shaft (not shown).

The second bushing piece 1180b defines a bushing surface 1186 (e.g., similar to the bushing surface 1116 of FIG. 11A). When the bearing 1100 is installed in the carrier component 1124, the bushing surface 1186 lies along and is generally co-planar with the exterior surface 1170 of the extensive portion 1162, thereby allowing the vertical component 1176 of the lip seal 1174 to be positioned against the extensive portion 1162. The extensive portion 1162 also defines a second exterior surface 1188 parallel and opposite-facing relative to the exterior surface 1170. The first bushing piece 1180a defines a bushing surface 1190 that is generally co-planar with the parallel, opposite-facing exterior surface 1188 of the extensive portion 1162 to allow the vertical component 1192 of the lip seal 1194 to be positioned against the extensive portion 1162. The exterior surfaces 1170, 1188 can define the exterior surface of the extensive portion 1162.

The system 1150 also includes a retaining component 1196 for coupling and positioning the lip seal 1174 relative to the carrier component 1124. The system 1150 also includes a gel material 1198. When the gel material 1198 is exposed to a fluid, the gel material 1198 expands, urging the lip portion 1178 towards or into contact with a shaft. The gel material 1198 contracts in the absence of fluid to form or increase the size of a gap (not shown) between the shaft and the lip portion 1178.

Figure 12A:
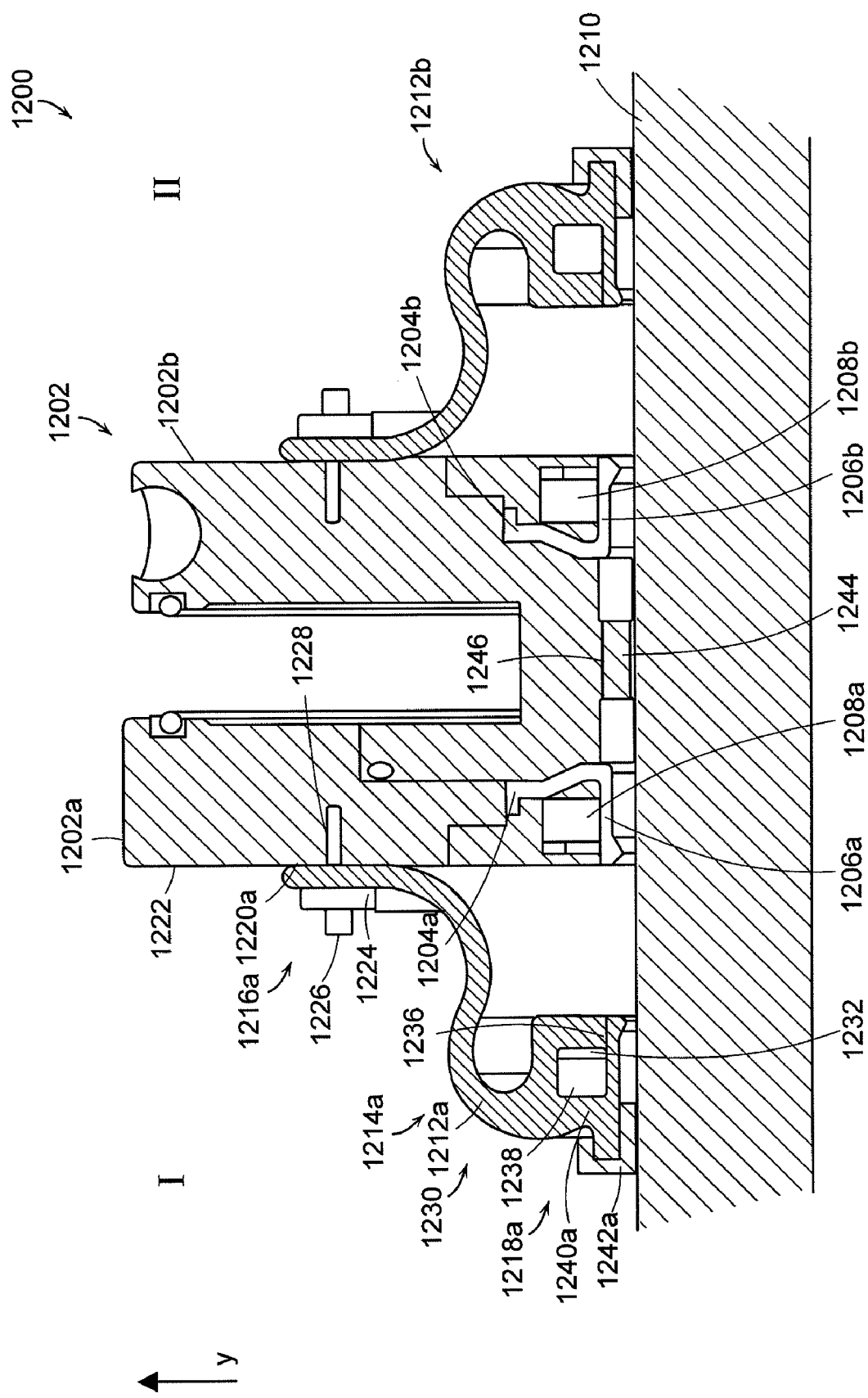
FIG. 12A is a cross-sectional view of a system that illustrates an embodiment of the invention.

FIG. 12A is a cross-sectional view of a system 1200 that illustrates an embodiment of the invention. The system 1200 includes a carrier component 1202 that includes a first piece 1202a and a second piece 1202b. The system 1200 includes a first seal 1204a having a first lip portion 1206a and a first gel material 1208a. The system 1200 includes a second seal 1204b (collectively with the first seal 1204a, 1204) having a second lip portion 1206b and a second gel material 1208b. The system 1200 is disposed about a shaft 1210, which can move relative to the system 1200 (e.g., via translation, rotation, or a combination thereof).

The system 1200 includes a first debris guard 1212a and a second debris guard 1212b (collectively 1212). The first debris guard 1212a is disposed in a first compartment I and the second debris guard 1212b is disposed in a second compartment II (e.g., compartments separated on a vessel or ship by a bulkhead or other structure). As will be appreciated from FIG. 12A, the first debris guard 1212a and the second debris guard 1212b are substantially identical. The first debris guard 1212a defines a flexible body 1214a that is disposed about the shaft 1210 when the first debris guard 1212a is installed (e.g., secured to the carrier component 1202). The flexible body 1214a allows the debris guard 1212a to translate, without failure, in the event the shaft 1219 translates radially (e.g., along a direction parallel to the y-axis), for example during a shock event. In some embodiments, the flexible body 1214a is made from an elastomeric material (e.g., a fluoroelastomeric material). The flexible body 1214a can also be made from a cloth material or a cloth material reinforced with a support structure (not shown) such as, for example, metallic boning or ribs. A function of the debris guard 1212a is to prevent or reduce an amount of material or contaminants (not shown) such as dust, dirt, or debris in the first compartment I from coming into contact with the first seal 1204a or the second seal 1204b or from passing to the second compartment II.

The first debris guard 1212a includes an outer diameter portion 1216a and an inner diameter portion 1218a. The outer diameter portion 1216a defines a surface 1220a to interface with a corresponding surface 1222 defined by the first piece 1202a of the carrier component 1202. The first debris guard 1212a is secured to the first piece 1202a of the carrier component 1202 with a structure 1224. The structure 1224 can be an annular ring positionable relative to the outer diameter portion 1216a. In some embodiments, the structure 1224 and the debris guard 1212a are secured to the first piece 1202a of the carrier component 1202 by one or more securing components 1226 that pass through the structure 1224 and the outer diameter portion 1216a into a corresponding bore 1228 in the carrier component 1202. The securing component 1226 can be, for example, a screw, a bolt, or a rivet. In some embodiments, the structure 1224 is coupled to the first piece 1202a using other techniques, for example, magnetic attraction. Some embodiments do not employ the structure 1224 and couple the outer diameter portion 1216a to the first piece 1202 by disposing an adhesive between the interface surface 1220a and the surface 1222 of the first piece 1202. Combinations of these techniques can also be used to position and/or secure the debris guard 1212a to the carrier component 1202. The carrier component 1202 includes a channel 1229 that interfaces to a corresponding surface (not shown) of a bulkhead (not shown) or a support component (not shown), similar to the operation of the system 800 of FIG. 8A or the bulkhead structure 960 described with respect to FIGS. 9C-9D.

The debris guard 1212a includes a sealing portion 1230 positioned relative to the inner diameter portion 1218a. The sealing portion 1230 includes a pocket 1232, a lip portion 1234, and an opening 1236. A gel material 1238 is disposed within the pocket 1232. When the gel material 1238 is exposed to a fluid (not shown), for example, a fluid that passes through the opening 1236, the gel material expands and urges the lip portion 1234 towards or into contact with the shaft 1210. In some embodiments, the lip portion 1234 is formed from or coated with a low-wear, low-friction, and/or low-corrosion material. In some embodiments, the sealing portion 1230 is a back-up seal (e.g., acting as a second seal relative to the first seal 1204a or the second seal 1204b).

The debris guard 1212a includes an extensive portion 1240a along the inner diameter portion 1218a. The system 1200 includes a ring 1242a that couples to the extensive portion 1240a of the debris guard 1212a and that circumscribes the shaft 1210. The extensive portion 1240a aligns and/or positions the ring 1242a relative to the shaft 1210 and/or the seal 1204. In some embodiments, there is a small clearance between the ring 1242a and the shaft 1210. The ring 1242a can also contact the shaft 1210 without causing excessive, e.g., wear when the ring is made from a light-weight material such as, for example, a TEFLON® material.

The system 1200 includes an alignment ring 1244 disposed between an inner surface 1246 of the carrier component 1202 (e.g., the second piece 1202b) and the shaft 1210. The alignment ring 1244 can be made from a low-wear, low-friction, and/or low-corrosion material, for example, a TEFLON® material. In some embodiments, the system 1200 includes a set of bearings (not shown) rather than the alignment ring 1244. For example, the plurality of bearings 1100 of FIGS. 11A-11B can be used with the system 1200 (e.g., upon appropriate modification of the carrier component 1202 as, for example, described above with respect to FIGS. 11B-11C).

In some embodiments, the system 1200 does not include the first seal 1204a and the second seal 1204b. In such embodiments, the first debris guard 1212a and the second debris guard 1212b prevent or reduce an amount of fluid passing from the first compartment I to the second compartment II and vice versa. Such an embodiment can be used, for example, where the pressure differential maintained across the sealing structure (e.g., the sealing portion 1230a) is relatively low.

Figure 12B:
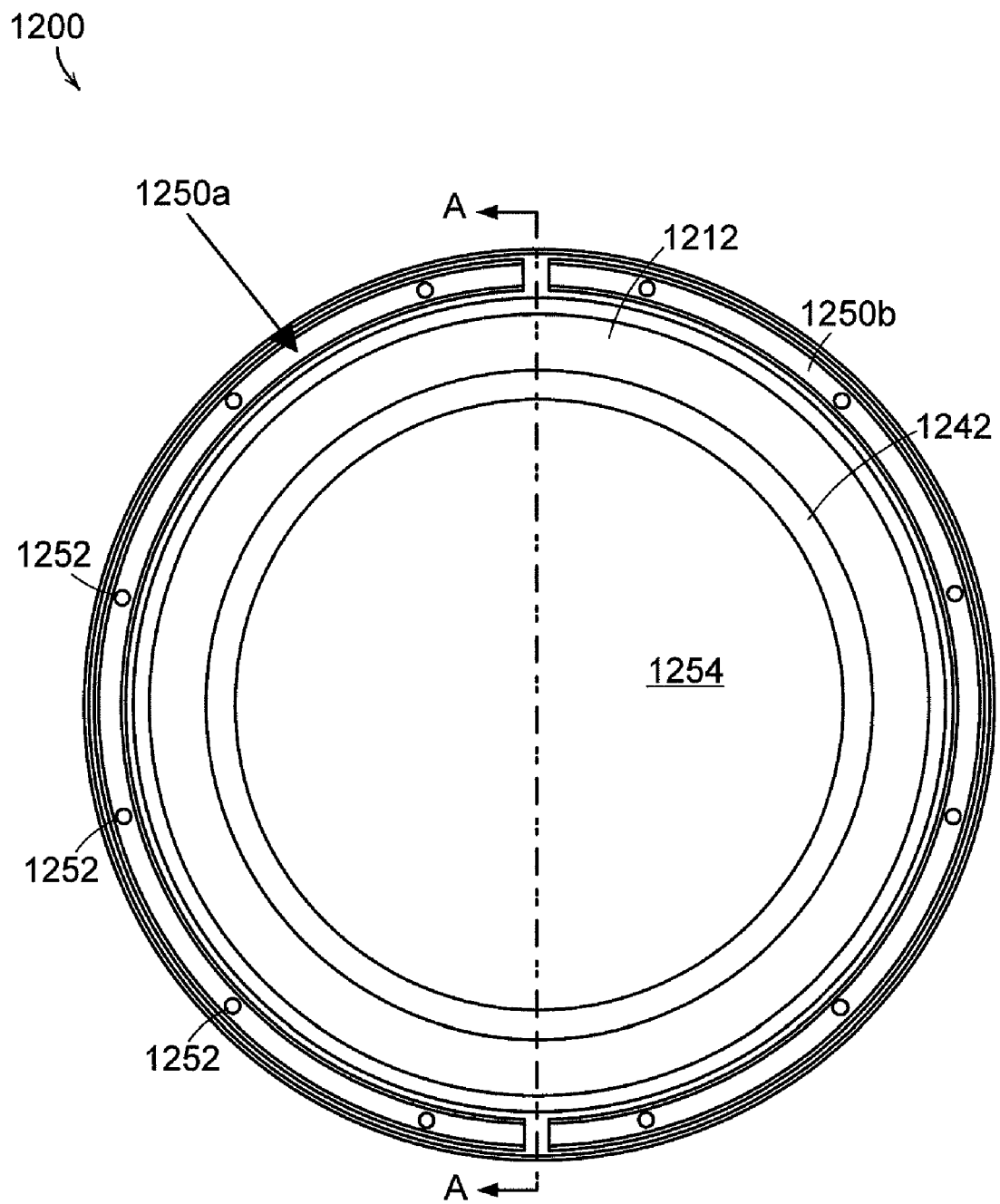
FIG. 12B is an elevation view of a portion of the system of FIG. 12A.

FIG. 12B is an elevation view of a portion of the system 1200 of FIG. 12A. FIG. 12B illustrates a first semi-circular structure 1250a and a second semi-circular structure 1250b (collectively, 1250). In some embodiments, the structure 1250 is the securing structure 1224 of FIG. 12A. The structure 1250 includes a plurality of through-holes 1252 for securing the system 1200 to a carrier component (not shown) or a support component (not shown), via for example, bolts, screws, rivets, pegs, or other mechanical fasteners that pass through the through-holes 1252 and into corresponding bores (not shown) in the carrier component or support component. The first structure 1250a and the second structure 1250b are semi-circular to facilitate mounting about the shaft (not shown) which passes through the opening 1254 defined by the debris guard 1212 and the ring 1242a.

Figure 12C:
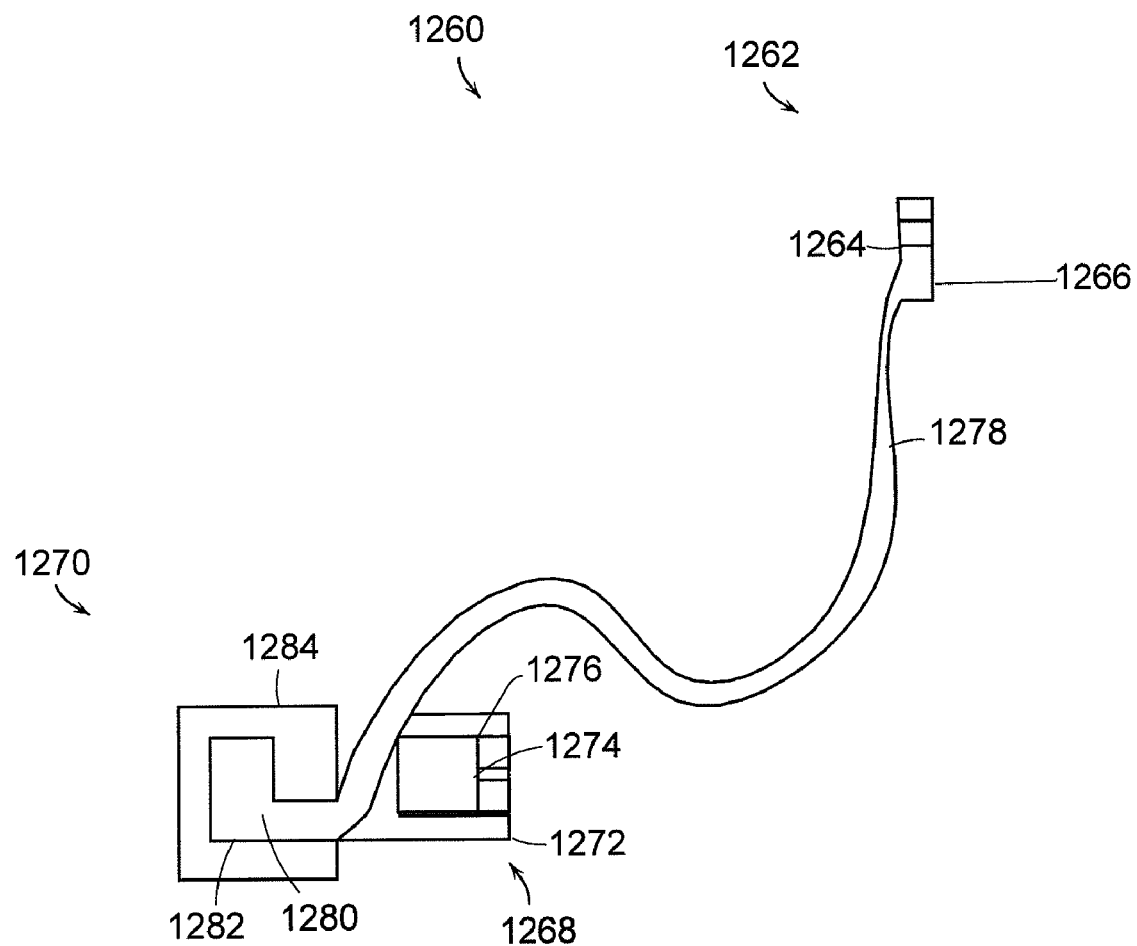
FIG. 12C is a cross-sectional view of a debris guard that embodies aspects of the invention.

FIG. 12C is a cross-sectional view of a debris guard 1260 that embodies aspects of the invention. The debris guard 1260 includes an outer diameter portion 1262 that defines a through-hole 1264 for facilitating mounting the debris guard 1212 and coupling an interface surface 1266 to a corresponding surface (not shown) of a carrier component (not shown) or support component (not shown). The debris guard 1260 is coupled to a sealing structure 1268 that is positioned relative to an inner diameter portion 1270 of the debris guard 1260. The sealing structure 1268 includes a lip portion 1272 and a gel material 1274 disposed within a pocket 1276 of the sealing structure 1268. The sealing structure 1268 and/or the lip portion 1272 can be made from an elastomeric material. As illustrated, the sealing structure 1268 is formed from a different material than the body 1278 of the debris guard 1260. In some embodiments (e.g., the embodiment illustrated in FIG. 12A), the debris guard 1212a and the sealing portion 1230 can be formed integrally (e.g., from the same material, such as an elastomeric material).

When the gel material 1274 is exposed to a fluid, the gel material 1274 expands, urging the lip portion 1272 towards or into contact with a shaft (not shown). In the absence of fluid (e.g., upon drying out), the gel material 1274 contracts, permitting the lip portion 1272 to return to an original or undeformed position. The lip portion 1272 can engage the shaft or nominally contact the shaft upon expansion by the gel material 1274.

The debris guard 1260 also includes an extensive portion 1280 disposed relative to the inner diameter portion 1270. The extensive portion 1280 is shaped to fit within a correspondingly-shaped pocket 1282 of a ring 1284. The extensive portion 1280 aligns and/or positions the ring 1284 relative to the shaft.

Figure 12D:
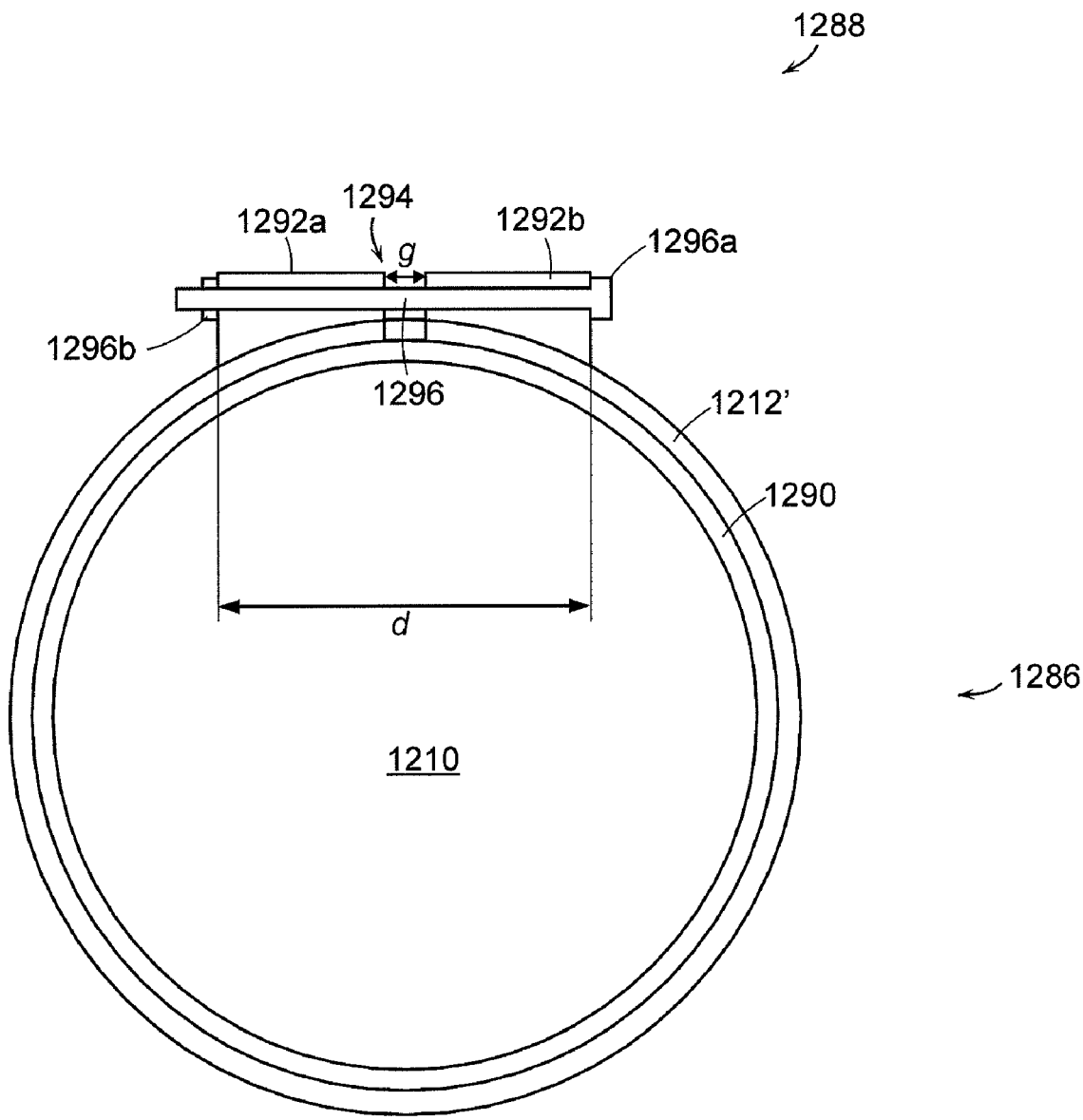
FIG. 12D is an elevation view of a system that includes a clamping structure.

FIG. 12D is an elevation view of a system 1286 that includes a clamping structure 1288. The system 1286 includes a debris guard 1212' and a ring 1290 that circumscribe a shaft 1210. The debris guard 1212' can be the debris guard 1212 of FIG. 12A or the debris guard 1260 of FIG. 12C. The ring can be the ring 1242a of FIG. 12A or the ring 1284 of FIG. 12C. The ring 1290 can be made from a low-wear, low-friction, and/or low-corrosion material (e.g., a TEFLON® material). The clamping structure 1288 can be formed integrally with either the debris guard 1212' or the ring 1290. The clamping structure 1288 includes a first clamping section 1292a and a second clamping section 1292b (collectively 1292) with a space 1294 therebetween. The clamping sections 1292 are coupled together by an adjustable connector system 1296. As illustrated, the connector system 1296 includes a bolt 1296a passing through the first clamping section 1292a and the second clamping section 1292b. A nut 1296b is secured to the bolt 1296a.

The system 1286 can be used for casualty control (e.g., to control or limit further fluid leakage in the event of catastrophic failure of other sealing components not shown). In such a situation, the shaft 1210 is stopped if the shaft is moving, and the nut 1296b and/or bolt 1296a is tightened, reducing the distance d therebetween, which correspondingly reduces the distance g between the clamping sections 1292. The nut 1296b and/or the bolt 1296a are tightened until the system 1286 contacts the shaft 1210 (e.g., until an inner diameter 1298 of the ring 1290 or debris guard 1212' are in contact with the shaft 1210).

While the invention has been particularly shown and described with reference to specific embodiments, it should be understood by those skilled in the art that various changes in form and detail may be made therein without departing from the spirit and scope of the invention as defined by the appended claims.

What is claimed is:

1. A fluid-activated shaft bulkhead seal system comprising:
an annular support fixed with respect to a bulkhead and about a rotating shaft extending through the bulkhead and the annular support;
an annular carrier including an inward alignment ring about and spaced from the rotating shaft, the annular carrier including an interior surface defining a channel receiving the annular support therein, the annular carrier including opposing side grooves each supporting an O-ring frictionally mated with an outside face of the annular support to seal the annular carrier with respect to the annular support, the annular carrier moveable with respect to the annular support when the rotating shaft contacts the alignment ring;

the annular carrier supporting a pair of lip seals, one on each side of the alignment ring, each lip seal including an outwardly facing pocket between a lip portion spaced from the rotating shaft and a portion abutting the annular carrier;

annular retainers, one mated to each side of the carrier, each retainer supporting a foam body in the pocket of each lip seal; and each foam body including a gel material configured to expand the foam body in the presence of a fluid urging the lip portions of the lip seals into contact with the periphery of the rotating shaft to seal the annular carrier with respect to the rotating shaft.

2. A fluid-activated shaft bulkhead seal system comprising:

an annular support fixed with respect to a bulkhead and about a rotating shaft extending through the bulkhead and the annular support;

an annular carrier including an inward alignment ring about and spaced from the rotating shaft, the annular carrier sealingly mated with respect to the annular support and moveable with respect thereto when the rotating shaft contacts the alignment ring;

the annular carrier supporting a lip seal on opposing sides of the alignment ring, each lip seal including an outwardly facing pocket between a lip portion spaced from the rotating shaft and a portion abutting the annular carrier;

annular retainers, one mated to each side of the carrier, each retainer supporting a foam body in the pocket of each lip seal; and each foam body including a gel material configured to expand the foam body in the presence of a fluid urging the lip portions of the lip seals into contact with the periphery of the rotating shaft to seal the annular carrier with respect to the rotating shaft.

3. The fluid-activated shaft seal system of claim 1 in which the annular carrier resides partially inside the annular support.

4. The fluid-activated shaft seal system of claim 3 in which the annular carrier includes opposing side grooves each supporting an O-ring frictionally mated with an inside face of the annular support.

5. The fluid-activated shaft seal system of claim 2 in which the annular carrier includes an interior surface defining a channel receiving the annular support therein.

6. The fluid-activated shaft seal system of claim 5 in which the interior surface includes opposing grooves each supporting an O-ring frictionally mated with an outside face of the annular support.

7. The fluid-activated shaft seal system of claim 2 in which each annular retainer includes spaced slots therethrough allowing fluid to contact the foam bodies.

8. The fluid-activated shaft seal system of claim 2 in which the alignment ring is closer to the shaft than the lip portions of each lip seal when the foam bodies are not expanded.

9. The fluid-activated shaft seal system of claim 2 in which the gel material is configured to contract in the absence of fluid returning the lip portions of the lip seals into a spaced relationship with respect to the shaft.

\* \* \* \* \*